United States Patent [19]

Hirano et al.

[11] Patent Number: 5,577,812

[45] Date of Patent: Nov. 26, 1996

[54] BRAKING FORCE CONTROL SYSTEM FOR MOTOR VEHICLE

[75] Inventors: Yutaka Hirano; Akira Eiraku, both of Susono; Shin'ichi Soejima; Yoshinori Kadowaki, both of Toyota, all of Japan

[73] Assignee: Toyota Jidosha Kabushiki Kaisha, Toyota, Japan

[21] Appl. No.: 608,461

[22] Filed: Feb. 28, 1996

[30] Foreign Application Priority Data

Mar. 14, 1995 [JP] Japan ..................... 7-054474

[51] Int. Cl.⁶ .................... B60T 8/58; B60T 8/66
[52] U.S. Cl. .................... 303/112; 188/181 T; 303/166; 303/186; 303/199; 303/DIG. 4; 303/165
[58] Field of Search ................... 303/112, 166, 303/174, 186, 113.5, 165, 164, DIG. 3, DIG. 4, 160, 199; 188/181 T

[56] References Cited

U.S. PATENT DOCUMENTS 4,836,618  6/1989  Wakata et al. ............ 303/DIG. 4
5,403,075  4/1995  Fujioka ....................... 303/166

FOREIGN PATENT DOCUMENTS 5-502423  4/1993  Japan.

*Primary Examiner*—Douglas C. Butler
*Attorney, Agent, or Firm*—Oliff & Berridge

[57] ABSTRACT

A braking force control system for a motor vehicle, in which a hydraulic pressure control device controls a hydraulic pressure generated by the master cylinder or the pump, in such a way that a target braking torque (Nr in FIG. 1) is calculated from a target slip factor (Sr) and an actual slip factor (S), the target braking torque (Nr) is converted into a target braking hydraulic pressure (Pr), and that an estimative braking hydraulic pressure (P) currently under action is calculated by the use of a hydraulic pressure model, while the controlled variable of the hydraulic pressure control device is calculated from the estimative braking hydraulic pressure (P) and the target braking hydraulic pressure (Pr) by the use of a reverse hydraulic pressure model. Thus, the hydraulic pressure can be controlled in conformity with the actual motion state of the motor vehicle.

10 Claims, 16 Drawing Sheets

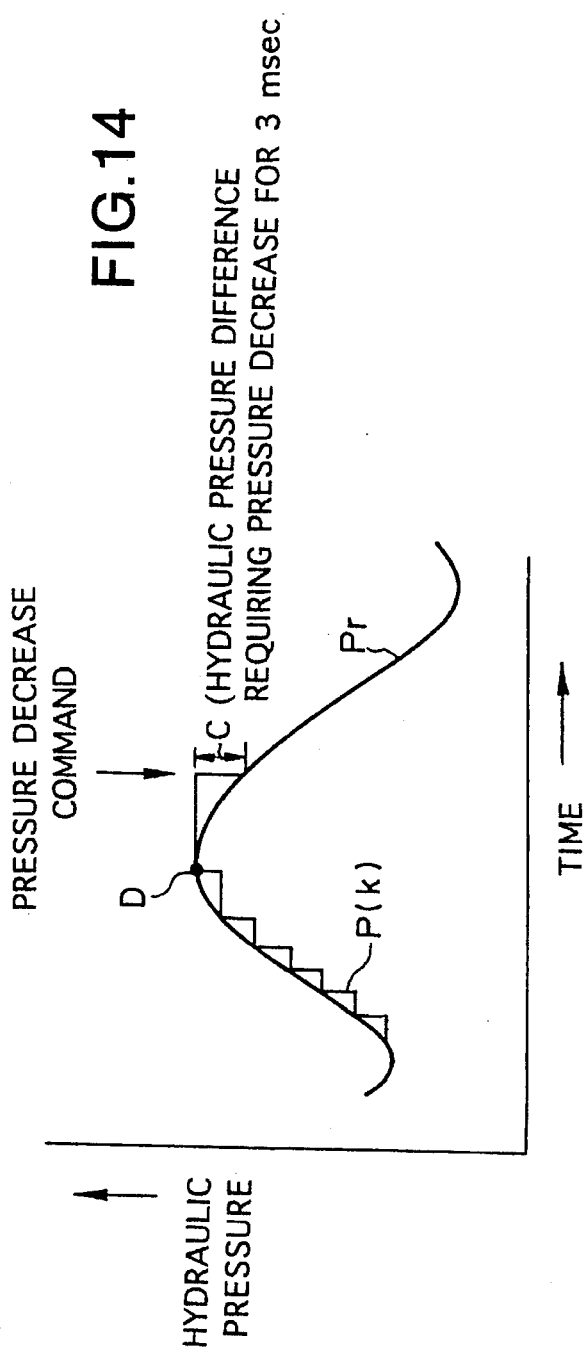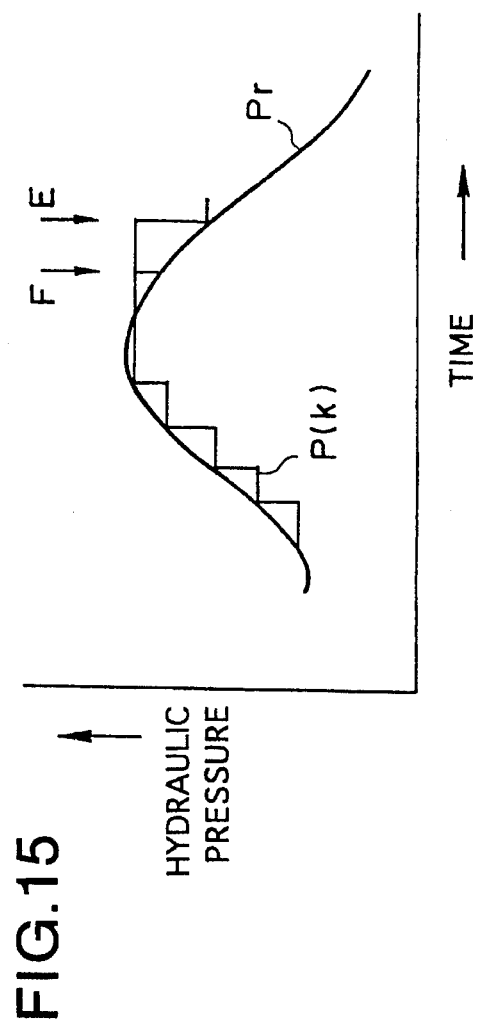

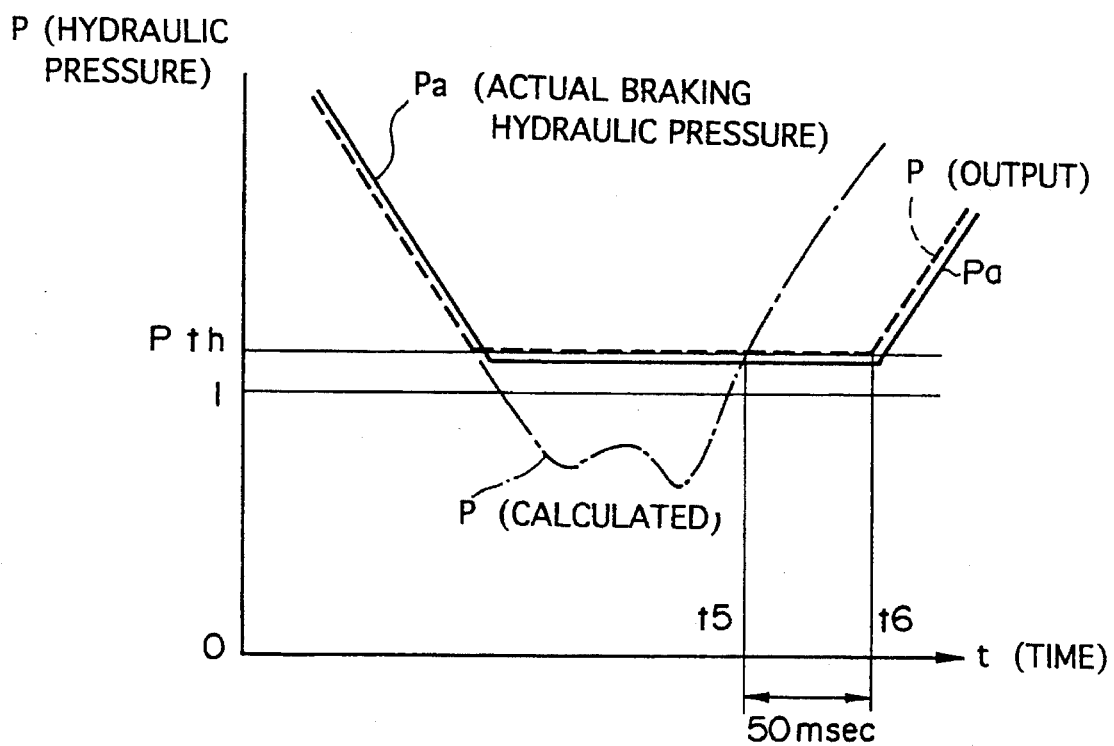

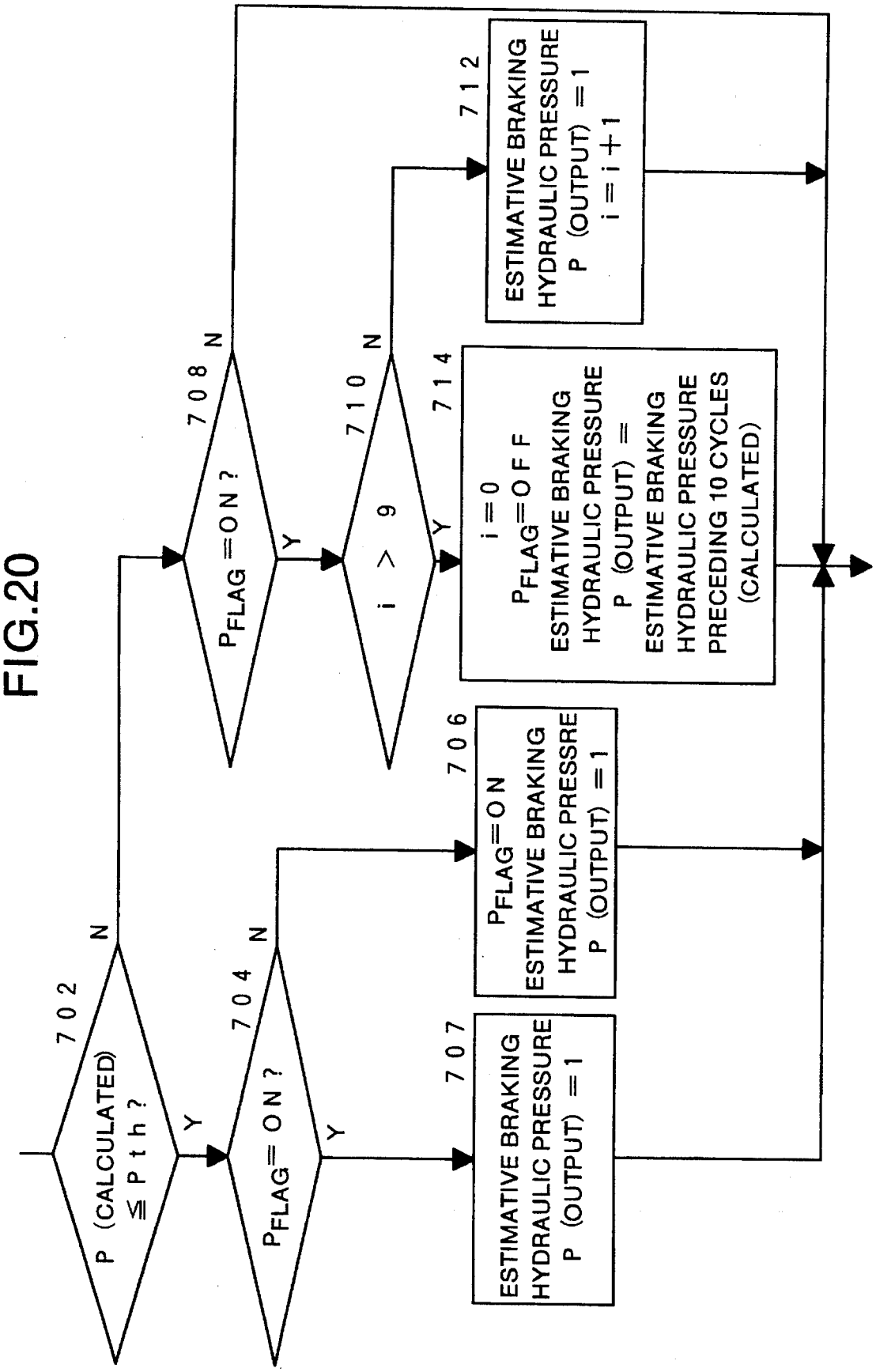

BRAKING FORCE CONTROL SYSTEM FOR MOTOR VEHICLE

BACKGROUND OF THE INVENTION

1. Field of the Invention

The present invention relates to a braking control for a motor vehicle. More particularly, it relates to a braking force control system for a motor vehicle wherein a hydraulic pressure generated by the master cylinder (or a pump) of a braking system is controlled to increase or decrease, in accordance with drive conditions of the motor vehicle.

2. Description of the Prior Art

Heretofore, antiskid systems have been developed in order to secure the stability and steerability of a motor vehicle in the sudden braking operation, etc. thereof. With such a system, a hydraulic pressure generated by the master cylinder of a braking system is controlled to increase or decrease, in accordance with the drive conditions of the motor vehicle, e. g., the rotating situation of wheels and the situation of a road surface. Thus, the antiskid system prevents the wheels from undergoing any excessive braking force and from coming to lock.

According to Japanese Patent Application Laid-open No. 502423/1993, the target (or desired) braking hydraulic pressure of the braking system is obtained by a PI (proportional-plus-integral) feedback control based on the deviation between a target slip and an actual slip which is evaluated from wheel speeds, a vehicle speed, etc. Besides, the switching of an antiskid-hydraulic-pressure control valve is controlled in such a way that the switching time of the valve is evaluated on the basis of a reverse hydraulic pressure model according to the target braking hydraulic pressure mentioned above, a feed pressure which is supplied by the master cylinder of the braking system, and a side force which acts on the wheel.

In any of the braking force control systems of this type in the prior art, including the aforecited system of Japanese Patent Application Laid-open No. 502423/1993, the target braking hydraulic pressure serving as the index of the control is obtained directly from such parameters as the target slip, the wheel speeds and the vehicle speed. This has posed the problem that a finer comprehensive or overall control conforming to the motion characteristics of the motor vehicle cannot be realized.

By way of example, in evaluating the switching time of the valve by the use of the reverse hydraulic pressure model, the control system disclosed in Japanese Patent Application Laid-open No. 502423/1993 supposes a mere orifice as a valve model and calculates the valve switching time in accordance with the static model. In the practical hydraulic system, however, a high precision cannot be secured unless the change of a piping rigidity is considered. Further, the generated hydraulic pressure cannot be controlled at a satisfactory precision unless the valve switching time is calculated in accordance with a dynamic model in which even the motions of the motor vehicle, the gain and phase of an actuator, the hydraulic pressure characteristics of the actuator, etc. are taken into consideration.

Any of the prior-art control systems has therefore had the problem that the gain and phase of the actuator or the hydraulic pressure characteristics thereof, for example, sometimes fail to appropriately match with the actual motions of the motor vehicle, so the control of braking forces does not always become optimal in the vehicle behavior control.

In other words, the method stated before, in which the "target braking hydraulic pressure" is evaluated directly from the parameters of the target slip, the wheel speeds, the vehicle speed or the likes, has had the problem that, even if such target braking hydraulic pressures are favorably calculated for the right and left wheels independently of each other, by way of example, the "resulting actual braking forces to the right and left wheels" does not always match favorably with the real behavior state of the motor vehicle.

As a matter of fact, therefore, it has been actually difficult to positively utilize the control of the braking forces for the motion control, attitude control, etc. of the motor vehicle.

SUMMARY OF THE INVENTION

The present invention has been made in order to solve the problems of the prior art, and has for its object to provide a braking force control system for a motor vehicle, capable of a braking control which conforms to the actual motion state or behavior state of the motor vehicle.

The present invention has achieved the above object by adopting a construction as defined in claim 1, the main structure of which is shown in FIG. 1.

In operation, according to the present invention, the actual slip factor (or rate) is calculated from the wheel speed and the vehicle speed, and a physical quantity termed the "target braking torque" is first calculated using the calculated actual slip factor and the target slip factor. The physical quantity of the target braking torque has a concept of an identical dimension with various elements expressive of the motions and behaviors of the motor vehicle. It can therefore be set so as to finely cope with the real motion and behavior of the motor vehicle on each occasion.

Subsequently, the desired braking torque is converted into the desired braking hydraulic pressure. Besides, the estimative braking hydraulic pressure which is estimated to be currently acting in the braking system for the wheel of the motor vehicle is calculated from the past value of the estimative braking hydraulic pressure and the hydraulic pressure of the master cylinder by the use of the hydraulic pressure model.

Further, the true controlled variable to be set by the hydraulic pressure control device is calculated from the calculated estimative braking hydraulic pressure and the desired braking hydraulic pressure by use of the reverse hydraulic pressure model. Here, the expression "controlled variable" signifies, for example, the increasing, decreasing or holding switching time of a three-position solenoid valve which is employed for the hydraulic pressure control device, or the driving current of a linear control valve which is employed for the same.

In this manner, in the present invention, the desired braking hydraulic pressure is not computed directly, but the desired braking torque is calculated beforehand. It is therefore possible to obtain the control index which conforms to the actual motion of the motor vehicle. Besides, owing to the introduction of the hydraulic pressure model and the reverse hydraulic pressure model, it is permitted to accurately grasp the actual hydraulic pressure at the current point of time, and to accurately grasp the process in which the actual hydraulic pressure really changes toward the desired hydraulic pressure, in other words, to dynamically grasp the hydraulic pressure. It is therefore possible to perform the control so that the desired braking torque calculated may really act in the motor vehicle effectively.

The present invention is accordingly applicable, not only to an antiskid control and an acceleration slip control, but also to other various controls including an example in which the motion of the motor vehicle under turning is controlled by bestowing braking forces on the right and left wheels (independently of a driver's braking operation). Thus, it can enhance the stability and steerability of the motor vehicle during the drive thereof from a comprehensive viewpoint.

Moreover, in the case where an error ascribable to the hydraulic pressure control device is compensated for in the calculation of the desired braking torque, the controlled variable can be calculated in conformity with a precise model owing to the cancellation of an error component.

Besides, in the case where a frequency shaping based on the H $\infty$ control is performed in the compensation for the error, the phase lag of a controlled system can be compensated in the frequency domain of PI feedback by a frequency shaping filter.

In addition, in the case where the control gain is altered in accordance with the vehicle speed in the compensation for the error (the gain is set high during low speed), the influence of noise ascribable to wheel vibrations etc. is relieved.

Still in addition, in the case where the braking system includes the proportioning valve (hereinbelow, abbreviated to "P valve") in the hydraulic pressure pipe laid on the rear wheel side and where the desired braking torque is converted so that the desired braking hydraulic pressure may rise more greatly on the rear wheel side than on the front wheel side, the desired braking torque can be converted dynamically in conformity with a model in which the function of the P valve is considered.

Yet in addition, in the case where the braking system includes the P valve in the hydraulic pressure pipe laid on the rear wheel side and where the hydraulic-pressure time constant of the hydraulic pressure model determined by the characteristics of the hydraulic pressure pipe is altered before and behind the hydraulic-pressure-bend-point of the P valve in the calculation of the estimative braking hydraulic pressure of the rear wheel side, the error of the estimative hydraulic pressure to be calculated can be lessened.

Further, in the case where the voltage of the voltage source is detected so as to alter the hydraulic-pressure time constant in accordance with the detected voltage, the hydraulic pressure control can be performed in consideration of that response delay of the hydraulic pressure control device which occurs due to the fluctuation of the voltage value of the voltage source.

Still further, in the case where the calculated controlled variable is corrected to increase up to the controllable value when the calculated controlled variable has the value which is too small to be controlled by the hydraulic pressure control device, the control timing of the hydraulic pressure control device can be prevented from delaying.

Yet further, in the case where the delay of the actual braking hydraulic pressure with respect to the calculated estimative braking hydraulic pressure is compensated, the deviation between the estimated braking hydraulic pressure and the actual braking hydraulic pressure lessens, so the hydraulic pressure can be appropriately controlled.

Also, in the case where, when the calculated estimative braking hydraulic pressure has lowered to the predetermined value equivalent to the atmospheric pressure in the braking force control, the estimative braking hydraulic pressure is maintained at the predetermined value until the predetermined time period lapses since the calculated estimative braking hydraulic pressure has resumed to the value greater than the predetermined value, the difference between the estimative braking hydraulic pressure and the actual braking hydraulic pressure can be prevented from enlarging, and the hydraulic pressure can be controlled considering the influence of that unusual delay of rise in the hydraulic pressure which occurs when the hydraulic pressure is increased again from the pressure equivalent to the atmospheric pressure.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein:

FIG. 14 is a graph showing the relationship between the actual braking hydraulic pressure and the estimative braking hydraulic pressure of a braking system;

FIG. 15 is a graph for explaining the control of the fifth embodiment of the present invention;

FIG. 19 is a graph for explaining the control of the seventh embodiment of the present invention; and FIG. 20 is a flow chart showing the control of the seventh embodiment.

DETAILED DESCRIPTION OF THE PREFERRED EMBODIMENTS

Now, the embodiments of the present invention will be described in detail with reference to the drawings.

Figure 2:
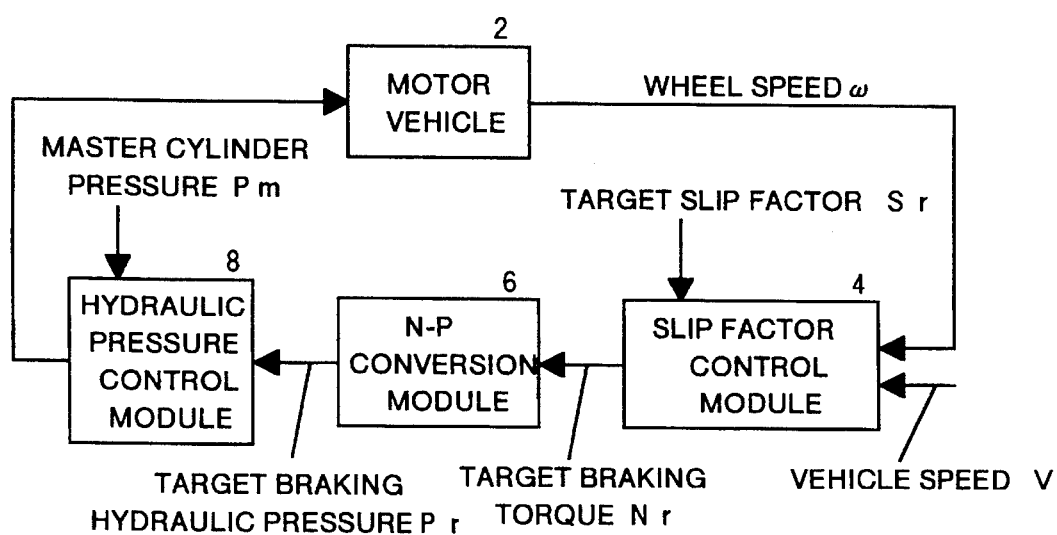
FIG. 2 is a block diagram showing the schematic construction of the first embodiment of the present invention.
Figure 3:
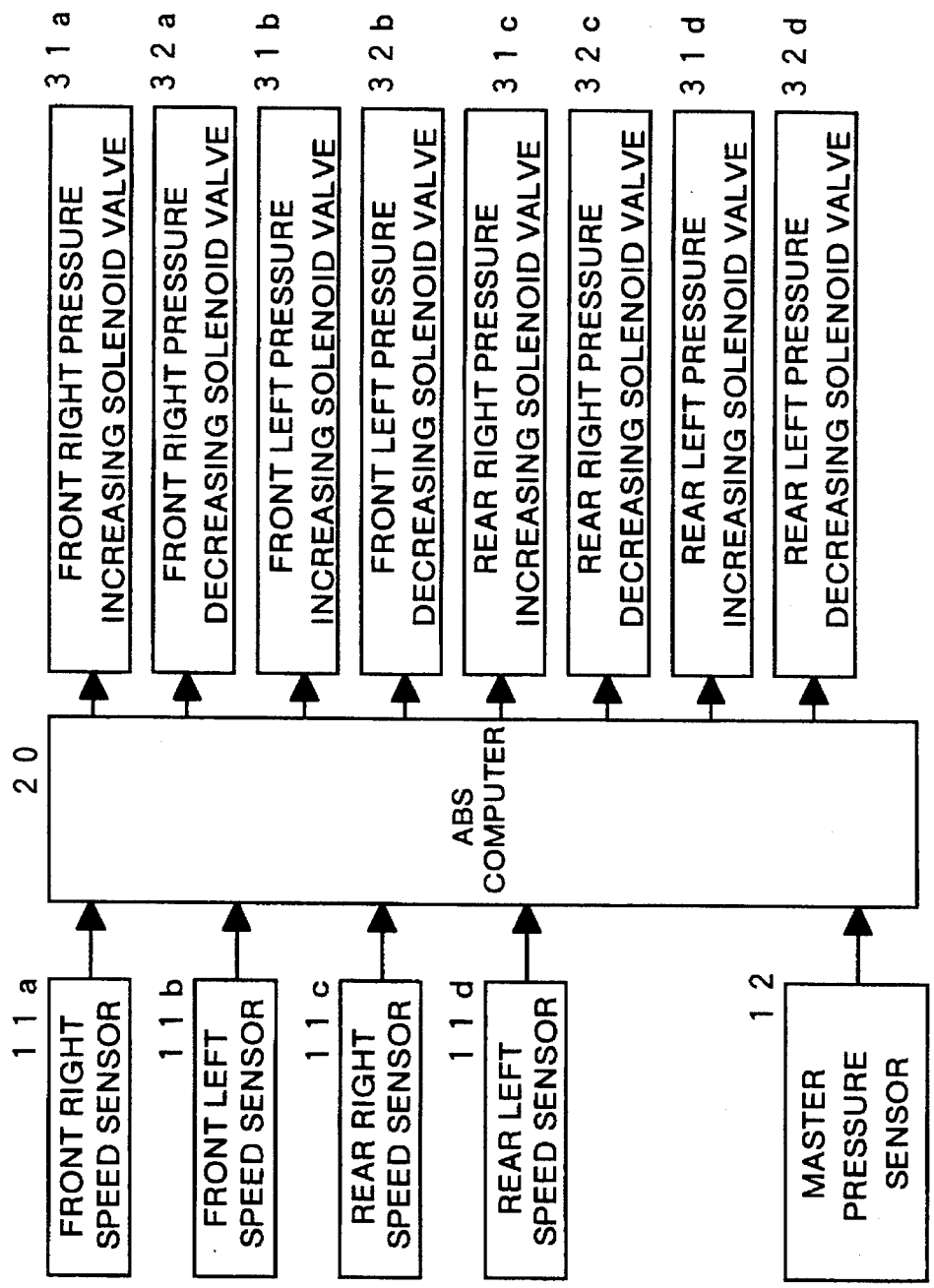
FIG. 3 is a block diagram showing a control circuit in the first embodiment.

In the first embodiment, the present invention is applied for an antiskid control system. The schematic construction of the first embodiment is illustrated in FIG. 2, while a control circuit therefor is illustrated in FIG. 3.

A braking force control system for a motor vehicle in this embodiment is so constructed that a hydraulic pressure (master cylinder pressure) Pm generated by the master cylinder of the known braking system (not shown) of the motor vehicle 2 is controlled to increase or decrease in accordance with the drive state of the motor vehicle 2. The braking force control system comprises a Slip factor (rate) control module 4, an N-P conversion module 6, and a hydraulic pressure control module 8.

Figure 1:
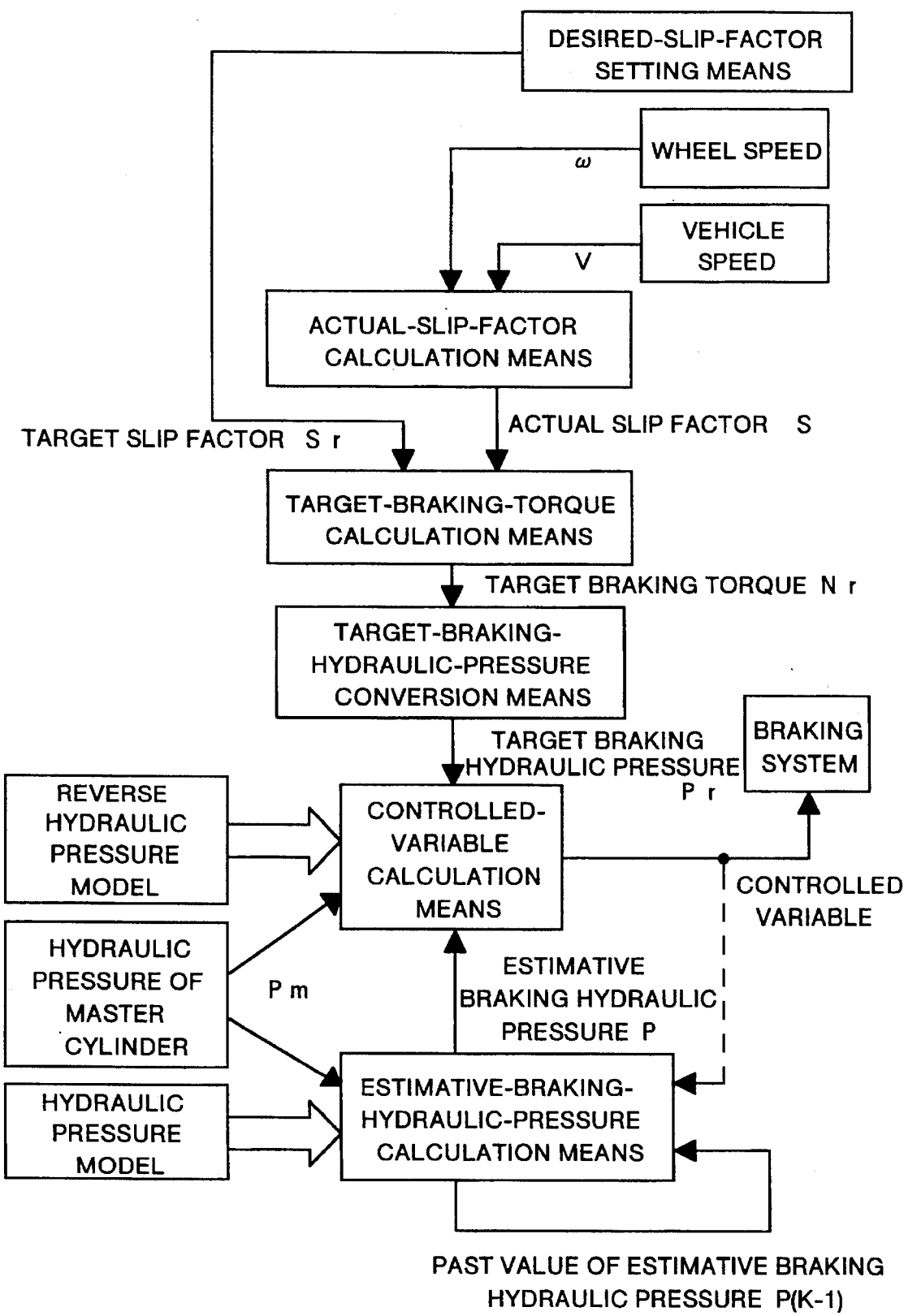
FIG. 1 is a conceptional block diagram showing the gist of the present invention.

The slip factor control module 4 corresponds to actual-slip-factor calculation means and target-braking-torque calculation means shown in FIG. 1, and calculates an actual slip factor S and a target braking torque Nr. The N-P conversion module 6 corresponds to target-braking-hydraulic-pressure conversion means, and converts the target braking torque Nr into a target braking hydraulic pressure Pr. The hydraulic pressure control module 8 corresponds to estimative-braking-hydraulic-pressure calculation means and controlled-variable calculation means, and calculates a valve control time $t_i$ for a pressure increase or a valve control time $t_d$ for a pressure decrease, the valve control times $t_i$, $t_d$ being required for realizing the target braking hydraulic pressure Pr.

More specifically, the slip factor control module 4 calculates the actual slip factor S from a wheel speed (angular wheel velocity) ω and a vehicle speed V. Besides, it calculates the target braking torque Nr from a target slip factor Sr and the actual slip factor S in consideration of the drive state or behavior state of the motor vehicle 2 so that the wheel speed ω may have the desired slip factor Sr.

The hydraulic pressure control module 8 calculates an estimative braking hydraulic pressure P which is estimated to be currently acting in the braking system, by the use of a hydraulic pressure model from the master cylinder pressure Pm generated by the master cylinder and the target braking hydraulic pressure Pr mentioned above. Besides, it calculates the valve control time $t_i$ or $t_d$ for the pressure increase or pressure decrease which is required for realizing the target braking hydraulic pressure Pr calculated by the N-P conversion module 6, from the calculated estimative braking hydraulic pressure P and this target braking hydraulic pressure Pr.

In actuality, the roles of the slip factor control module 4, N-P conversion module 6 and hydraulic pressure control module S are filled by an ABS (antilock brake system) computer 20 shown in FIG. 3. More specifically, the wheel speed ω of each wheel of the motor vehicle is detected by the corresponding one of wheel speed sensors 11a–11d, while the master cylinder pressure Pm is measured by a master pressure sensor 12. The above calculation is executed in the ABS computer 20 so that one of solenoid valves 31a–31d and 32a–32d corresponding to the pertinent wheel is controlled for the calculated valve control time $t_i$ or $t_d$.

Now, the operation of this embodiment will be detailed as to the individual control functions thereof.

First, the operation of the slip factor control module 4 will be explained from the viewpoint of the equations of motions of one wheel (specific wheel) Wh and the motor vehicle.

Figure 4:
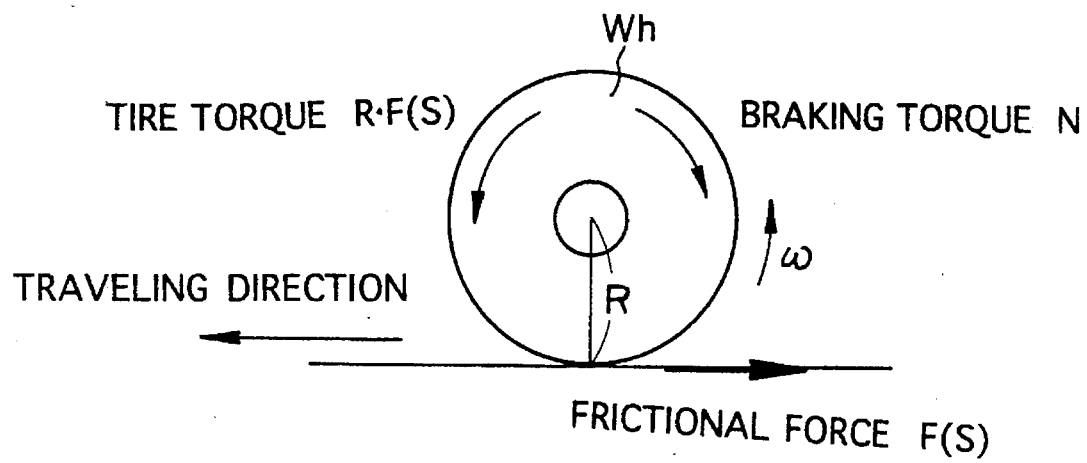
FIG. 4 is an explanatory diagram showing forces which act on a wheel.

Letting M denote a vehicular weight corresponding to one wheel, V a car body speed, I the moment of inertia of a tire, R the radius of the tire, N a braking torque, ω a wheel speed (the angular velocity of the wheel), S an actual slip factor (rate), and F(S) the reaction force of a road surface acting on the tire, the forces act on the wheel Wh as shown in FIG. 4. On this occasion, the equations of motions of the wheel Wh and the motor vehicle are respectively expressed by the following equations (1) and (2):

$$I \cdot (d\omega/dt) = R \cdot F(S) - N \quad (1)$$

$$M \cdot (dV/dt) = -F(S) \quad (2)$$

Besides, the actual slip factor S is given by the following equation (3):

$$S = (V - R\omega)/V \quad (3)$$

Figure 5:
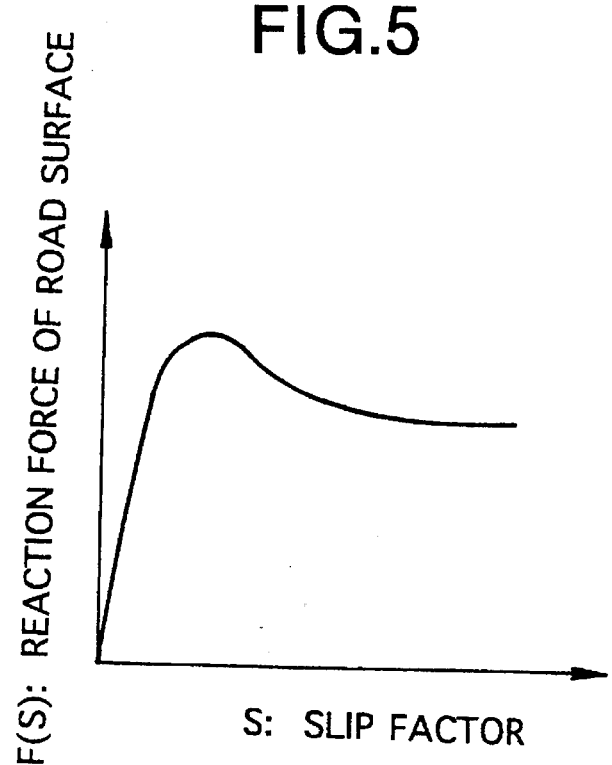
FIG. 5 is a graph showing the relationship between the reaction force of a road surface and the slip factor (rate) of the wheel.

The relationship between the actual slip factor S and the road-surface reaction force F(S) is illustrated in FIG. 5. In addition, Eq. (3) is solved for the wheel speed ω as indicated by the following equation (4):

$$\omega = (1-S)V/R \quad (4)$$

When the term F(S) is eliminated from Eqs. (1) and (2), the following equation (5) is obtained:

$$N = -I \cdot (d\omega/dt) - R \cdot M \cdot (dV/dt) \quad (5)$$

The derivation of a target braking torque Nr based on the polar arrangement method will be explained below.

When a target slip factor is denoted by Sr and is substituted into Eq. (4), a target wheel speed $\omega_r$ is given by the following equation (6):

$$\omega_r = (1-Sr)V/R \quad (6)$$

Here, when the deviation e between the wheel speed ω and the target wheel speed $\omega_r$ is put as indicated by the following equation (7) and is differentiated with respect to time t, an equation (8) is obtained:

$$e = \omega - \omega_r = \omega - (1-Sr)V/R \quad (7)$$

$$de/dt = d\omega/dt - \{(1-Sr)/R\} \cdot (dV/dt) \quad (8)$$

When the term dω/dt is eliminated from Eqs. (5) and (8), the following equation (9) is obtained:

$$de/dt = \{-(R \cdot M/I) - (1-Sr)/R\} \cdot (dV/dt) - N/I \quad (9)$$

On this occasion, if de/dt=–a·e holds where letter a denotes a plus constant (a>0), the deviation e converges to zero (e→0) (polar arrangement method). Therefore, when Eq. (9) is changed to the following equation (10), the target braking torque Nr can be indicated by an equation (11):

$$-a \cdot e = \{-(-R \cdot M/I) - (1-Sr)/R\} \cdot (dV/dt) - N/I \quad (10)$$

$$Nr = I \cdot a \cdot e + \{-R \cdot M - (1-Sr)I/R\} \cdot (dV/dt) \quad (11)$$

Here, the term dV/dt of Eq. (11) will be studied. This term dV/dt is essentially the reaction force F(S) of the road surface acting on the wheel Wh, as seen from Eq. (2). Regarding the wheel Wh which is under the antiskid control, the term dV/dt is considered to contain a fast motion ascribable to the fluctuation of a slip and a slow motion ascribable to the braking of the motor vehicle itself (usually, the slow motion is a constant deceleration).

However, since the vehicle speed V is actually difficult to detect directly, it has heretofore been computed by the use of a kind of guard for the supposed values of a vehicle deceleration, the guard being set on an envelope in the graph of the wheel speed ω of each wheel. Accordingly, the fast motion ascribable to the slip fluctuation is considered to be lacking in the computed vehicle speed V.

It is also considered from Eq. (5) that the fast motion of the road-surface reaction force F(S), i. e., the true deceleration dV/dt will be greatly reflected by the term dω/dt, while the slow motion will be reflected by the central value of the braking torque N. Accordingly, when the central value of the braking torque N is set as a nominal braking torque Nnom, the true deceleration dV/dt is considered to be estimable from the following equation (12):

$$dV/dt = k1 \cdot (d\omega/dt) + k2 \cdot Nnom \qquad (12)$$

Here symbols k1 and k2 denote constants, respectively.

When Eq. (12) is substituted into Eq. (11) to eliminate the term dV/dt, the following equation (13) is obtained:

$$\begin{aligned} Nr &= I \cdot a \cdot e + \{-R \cdot M - (1-Sr)I/R\} \cdot \\ & \quad \{k1 \cdot (d\omega/dt) + k2 \cdot Nnom\} \\ &= Kp \cdot e + Kd \cdot (d\omega/dt) + Kn \cdot Nnom \end{aligned} \qquad (13)$$

Here symbols Kp, Kd and Kn denote feedback gains, respectively.

It is accordingly permitted to evaluate the target braking torque Nr in conformity with the above equation (13). In Eq. (13), the term dω/dt can also be deemed the derivative de/dt which is biased. Besides, the nominal braking torque Nnom is a quantity corresponding to an average deceleration in the slowdown of the motor vehicle. Therefore, the term dω/Dt can also be replaced with the smoothed deceleration dV/dt (expressed by "(dV/dt)s") which is evaluated by the prior-art method or the like.

Thus, Eq. (13) can be rewritten into the following equation (14):

$$Nr = Kp' \cdot e + Kd' \cdot (de/dt) + Kn' \cdot (dV/dt)s \qquad (14)$$

Here symbols Kp', Kd' and Kn' denote feedback gains, respectively.

According to Eq. (14), the target braking torque Nr becomes computable when the wheel speed ω and the target slip factor Sr are given. Eq. (14) can also be deemed as an equation of PD (proportional-plus-derivative) feedback of the deviation e to which a bias value corresponding to the average deceleration is added. Accordingly, Eq.(14) can also be interpreted that it can be made the values of the feedback gains kp' and kd' small by bestowing the bias value so as to suppress useless vibrations.

As will be detailed later, in order to realize the above target braking torque Nr, the valve control time $t_i$ or $t_d$ is determined by employing a reverse model for a hydraulic circuit in the hydraulic pressure control module 8. In this regard, in a case where the parameters of the model and an actual actuator deviate, errors accumulate in succession, so that the deviation e undergoes a bias ascribable to the error accumulation. In order to nullify this bias, therefore, the integral of the deviation e needs to be fed back.

After all, a control rule in practice is expressed by the following equation (15) which is obtained by adding an integral term to Eq. (14):

$$Nr = Kp' \cdot e + Kd' \cdot (de/dt) + KI' \int_0^t e \cdot dt + Kn' \cdot (dV/dt)s \qquad (15)$$

Here symbol KI' denotes the feedback gain of the integral term.

Consequently, the target braking torque Nr is obtained by a PID (proportional-plus-integral-plus-derivative) feedback control. Here, the integral is carried out for an interval from the start of the control till the current time.

Besides, the individual feedback gains Kp', Kd' and KI' may well be constants. However, since the value of the deviation e becomes smaller in accordance with the lowering of the vehicle speed V in spite of an identical slip factor, the feedback gains Kp', Kd' and KI' should preferably be sensitive to the vehicle speed so as to be greater for lower vehicle speed V.

Next, there will be explained the operation of converting the target braking torque Nr into the target braking hydraulic pressure Pr in the N-P conversion module 6.

Usually, the target braking hydraulic pressure Pr is considered to be proportional to the braking torque Nr. It can therefore be given by the following equation (16):

$$Pr = k3 \cdot Nr - \qquad (16)$$

Here, symbol k3 denotes a constant.

However, since the rear wheel side of the motor vehicle includes a known P valve (proportioning valve), the desired braking hydraulic pressure Pr thereof is given by a map in which the characteristics of the P valve are taken into account. Accordingly, the pressure Pr on the rear wheel side can be written as indicated by the following equation (17):

$$Pr = Pr(Nr) \qquad (17)$$

Next, the operation of the hydraulic pressure control module 8 will be explained.

When the actuator is brought into the form of a hydraulic pressure model in accordance with a flow-rate model and the variation of a brake rigidity dependent upon the quantity of brake fluid or oil, the following equations (18) and (19) are held in case of a pressure increase model:

$$dP/dt = K a_i \sqrt{Pm - P} \qquad (18)$$

$$K = k \int_0^t a_i \sqrt{Pm - P} \cdot dt \qquad (19)$$

Here, letter P denotes an estimative braking hydraulic pressure, symbol Pm a master cylinder pressure, letter K the brake rigidity, and symbol $a_i$ a quantity relevant to a pressure increasing valve control (hydraulic-pressure time constant). Also, letter k denotes a constant. Besides, the integral is executed during a pressure increasing operation from the time t=0 till the time t=t.

On the other hand, in case of a pressure decrease model, the following equations (20) and (21) are held:

$$dP/dt = -Ka_d \sqrt{P - Pres} \qquad (20)$$

$$K = k \int_{tf-t}^{tf} a_d \sqrt{P - Pres} \cdot dt \qquad (21)$$

Here, symbol Pres denotes a reservoir pressure, and symbol $a_d$ a quantity relevant to a pressure decreasing valve control (hydraulic-pressure time constant). Besides the integral is executed during a pressure decreasing operation from a time t=$t_f$-t till a time t=$t_f$.

When Eqs. (18) and (19) are solved by letting symbol P(k−1) denote the estimative braking hydraulic pressure before the pressure increase and symbol $t_i$ denote a valve control time period for the pressure increase, the estimative braking hydraulic pressure P(k) at the current point of time is given by the following equation (22):

$$p(k) = [Pm + 2\sqrt{PmP(k-1) - P(k-1)^2} \cdot \quad (22)$$

$$\sin(a_i\sqrt{2k} \cdot t_i) - \{Pm - 2P(k-1)\} \cdot \cos(a_i\sqrt{2k} \cdot t_i]/2$$

Likewise, when Eqs. (20) and (21) are solved by letting symbol $t_d$ denote a valve control time period for the pressure decrease, the following equation (23) is obtained:

$$P(k) = Pres + \{P(k-1) - Pres\} \cdot \exp(-a_d\sqrt{2k} \cdot t_d) \quad (23)$$

Next, there will be explained the operation of evaluating the valve control time $t_i$ or $t_d$ by the use of the reverse hydraulic pressure model.

When Eqs. (22) and (23) are respectively solved as to the valve control time $t_i$ for the pressure increase and the valve control time $t_d$ for the pressure decrease by substituting the target braking hydraulic pressure Pr into the estimative braking hydraulic pressure P(k), the following equations (24) and (25) are obtained:

$$ti = \{\cos^{-1}(1 - 2Pr/Pm) - \cos^{-1}(1 - 2P(k-1)/Pm)\}/a_i\sqrt{2k} \quad (24)$$

$$td = \{\ln(P(k-1) - Pres) - \ln(Pr - Pres)\}/a_d\sqrt{2k} \quad (25)$$

Figure 6:
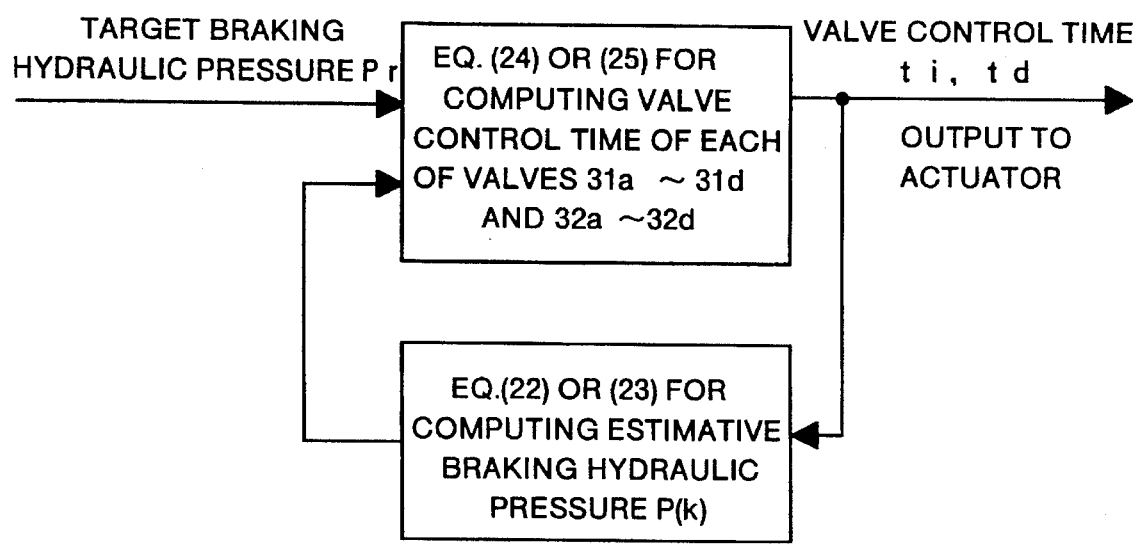
FIG. 6 is an explanatory diagram showing the function of a hydraulic pressure control module in the first embodiment.

The above description is schematized as illustrated in FIG. 6. The valve control time $t_i$ or $t_d$ is calculated from the target braking hydraulic pressure Pr by the corresponding equation (24) or (25). To the contrary, the current estimative braking hydraulic pressure P(k) is calculated from the valve control time $t_i$ or $t_d$ by the corresponding equation (22) or (23).

The aforementioned calculations are all executed by the ABS computer 20 shown in FIG. 3. A practicable algorithm therefor is illustrated as a flow chart in FIG. 7.

Figure 7:
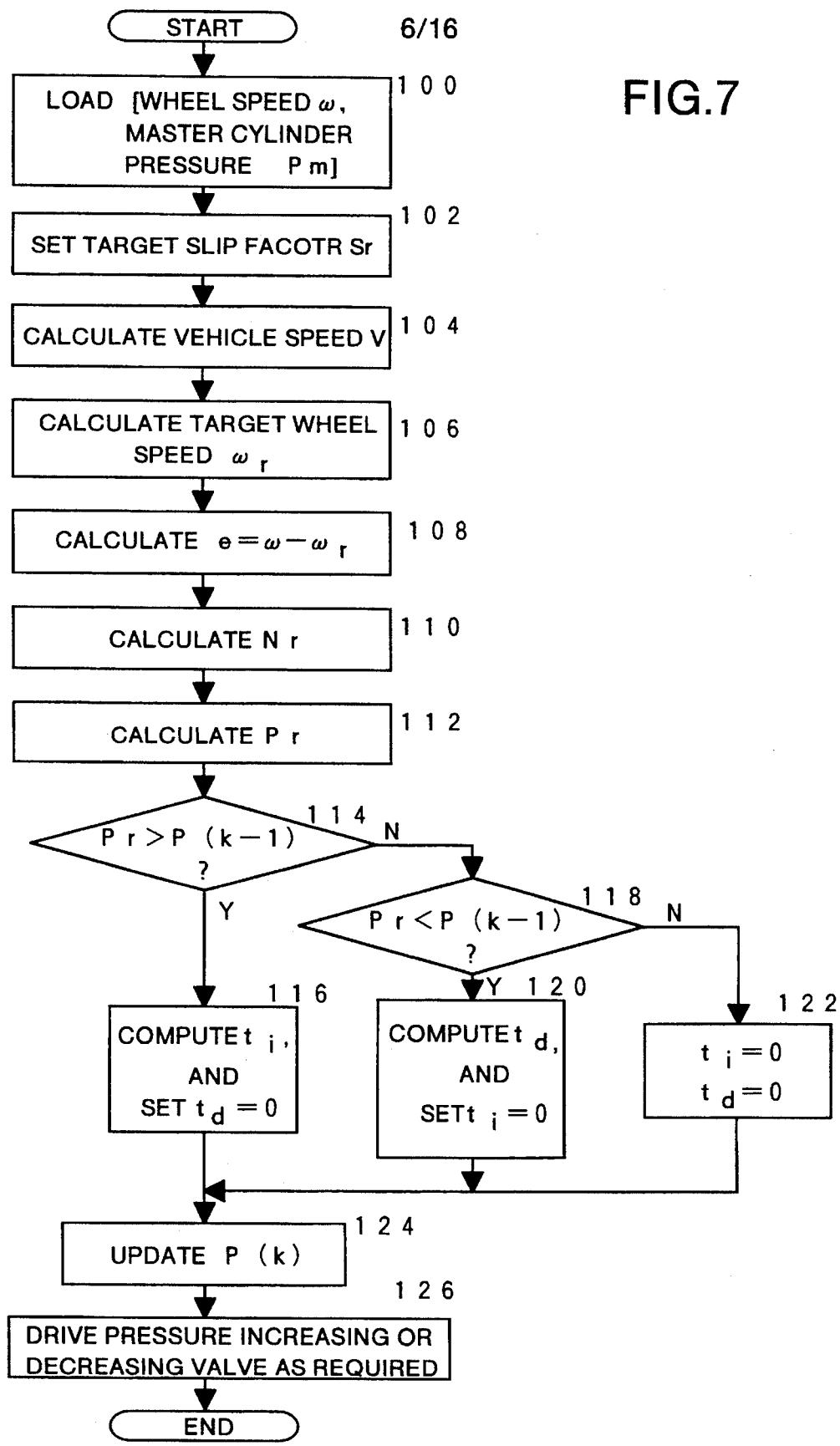
FIG. 7 is a flow chart showing the control of the first embodiment.

By the way, the calculations shown in FIG. 7 shall be executed as to every wheel in a fixed cycle.

First, at a step 100, a wheel speed ω and a master cylinder pressure Pm are loaded, and at a step 102, a desired slip factor Sr is set. Subsequently, a vehicle speed V is estimated and calculated by any known method at a step 104.

Next, a target wheel speed $ω_r$ is calculated in conformity with Eq. (6) at a step 106, and a deviation e =ω– $_r$ is calculated at a step 108. Besides, a target braking torque Nr is computed in conformity with Eq. (15) at a step 110, and a target braking hydraulic pressure Pr is computed in conformity with Eq. (16) or Eq. (17) at a step 112. Further, an estimative braking hydraulic pressure P(k–1) in the last cycle and the target braking hydraulic pressure Pr are compared at a step 114. If the hydraulic pressure Pr is greater than the hydraulic pressure P(k–1) (that is, if Pr>P(k–1) is held), a valve control time $t_i$ for pressure increase is computed in conformity with Eq. (24) at the next step 116, a valve control time $t_d$ for pressure decrease being nullified.

On the other hand, if the target braking hydraulic pressure Pr is not greater than the estimative braking hydraulic pressure P(k–1) in the last cycle (that is, if Pr≦P(k–1) is held) in the decision of the step 114, the control flow of the algorithm proceeds to a step 118, at which the target braking hydraulic pressure Pr is compared again with the estimative braking hydraulic pressure P(k–1) in the last cycle. If the target braking hydraulic pressure Pr is smaller (that is, if Pr<P(k–1) is held)), the valve control time $t_d$ for the pressure decrease is computed in conformity with Eq. (25) at a step 120, the valve control time $t_1$ for the pressure increase being nullified. In contrast, if the target braking hydraulic pressure Pr is not smaller than the estimative braking hydraulic pressure P(k–1) in the last cycle in the decision of the step 118, then Pr=P(k–1) is held, and hence, both the valve control times $t_i$ and $t_d$ are nullified at a step 122.

Subsequently, at a step 124, the value of the estimative braking hydraulic pressure P(k) is updated in conformity with Eq. (22) under the condition Pr>P(k–1) and in conformity with Eq. (23) under the condition Pr<P(k–1). In addition, the value of the estimative braking hydraulic pressure P(k–1) in the last cycle is held as it is, under the condition Pr=P(k–1).

Finally, at a step 126, the corresponding one of the valves 31a–31d and 32a–32d is driven on the basis of the valve control time $t_i$ or $t_d$ computed in the above. Thus, the pressure increase or decrease control is performed.

By the way, although Eq. (15) has been employed in the calculation of the target braking torque Nr at the step 110, the deviation (S–Sr) of the slip factors themselves may well be used instead of the deviation e(=ω–ωr), and the feedback gains Kp', Kd' and KI' may well be changed in accordance with the vehicle speed V as stated before. In addition, the smoothed deceleration (dV/dt)s may well be replaced with a nominal braking torque Nnom which is previously scheduled as a map so as to change its value depending upon the vehicle speed V or/and the state of a road surface.

Incidentally, the initial value of the estimative braking hydraulic pressure P shall be the master cylinder pressure Pm before the antiskid control operation (for each of the rear wheels, the pressure Pm calculated in terms of the P valve characteristics). Further, whether or not the antiskid control operation is proceeding shall be decided on the basis of any known logic.

As described above, according to the first embodiment, the target braking hydraulic pressure Pr for the computation of the valve control time is not calculated directly from the actual slip factor S or the target slip factor Sr, but it is calculated after the target control torque Nr, which is easily adjusted so as to conform to the state of the motor vehicle, is calculated and then adjusted in conformity with the vehicular state. It is therefore possible to compute the controlled variable which is adapted to the actual vehicular motion.

Moreover, in this embodiment, the phase difference is compensated by the derivative term of the PID control, so that hydraulic hunting ascribable to the phase lag of the actuator can be prevented from occurring. Furthermore, the feedback gains are altered in accordance with the vehicle speed, so that noise ascribable to the vibrations of the motor vehicle, etc. can be eliminated.

Now, the second embodiment of the present invention will be described.

The second embodiment consists in that, in the slip factor control module 4 shown in FIG. 2, the logic for computing the desired braking torque Nr is endowed with frequency characteristics (frequency shaping).

This contrivance is intended to solve a problem as stated below. In the actual antiskid control system, a dead time and a delay are involved in the actuator including the hydraulic system thereof. Therefore, the PI feedback according to, for example, the technique of Japanese Patent Application Laid-open No. 502423/1993 has the problem that, when the gain of the feedback is set high in order to attain an enhanced control performance, hunting takes place, whereas when the hunting is to be suppressed, the gain cannot avoid being set low. This problem is ascribable to the fact that the gain characteristics of the PI feedback cannot possess a complicated shape in the frequency domain thereof.

By way of example, the gain of a dead time element does not depend upon the frequency, but the phase thereof lags in proportion to the frequency. Accordingly, in the case where the controlled system involves the dead time, the gain is set low for an increased stability in a high frequency region, whereby the hunting can be suppressed, while the gain is set high in a low frequency region, whereby follow-up characteristics (performance) to a target value can be improved. In this manner, the frequency shaping for adjusting the gain must be carried out in the frequency domain as regards the controlled system which exhibits any of frequency-dependent characteristics such as the dead time, the delay and a vibration mode.

Next, there will be explained a practicable computational method in the second embodiment.

A filter for the frequency shaping as stated above is indicated in the form of a system coefficient matrix or a transfer function by any of methods known in the "H ∞ control"theory etc., on the basis of the physical models of the vehicle and the wheel system which constitute the controlled system. When the system coefficient matrix consisting of elements A, B, C and D is given, the target braking torque Nr[k] at a time $\underline{k}$ is computed from the deviation e [k] of the wheel speed in conformity with the following equations (26) and (27) (where letter $\underline{n}$ denotes the order of the filter):

$$x[k+1] = A\ x[k] + B\ e[k] \qquad (26)$$

$$Nr[k] = C\ x[k] + D\ e[k] \qquad (27)$$

Here, the term x[k] is a vertical vector of order $\underline{n}$ which expresses the internal state of the controlled system at the time $\underline{k}$. Besides, Eqs. (26) and (27) can be also expressed as the transfer function from the deviation $\underline{e}$ to the target braking torque Nr. Namely, the following equation (28) where letter $\underline{z}$ denotes a delay operator is obtained:

$$\begin{aligned} Nr &= F(z)e, \\ F(z) &= D + C(zI - A)^{-1} \cdot B \\ &= (b0 + b1\ z^{-1} + \ldots + bn\ z^{-n})/ \\ &\quad (1 + a1\ z^{-1} + \ldots + an\ z^{-n}) \end{aligned} \qquad (28)$$

On this occasion, the target braking torque Nr can be also computed in the form of the following equation (29):

$$Nr[k] = b0\ e[k] + b1\ e[k-1] + \ldots + bn\ e[k-n] - \qquad (29)$$
$$a1\ Nr[k-1] - \ldots - an\ Nr[k-n]$$

Figure 8:
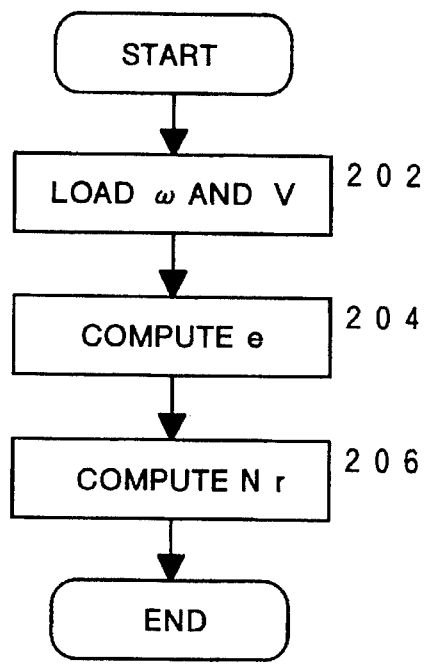
FIG. 8 is a flow chart showing the control of the second embodiment of the present invention.

The method of computing the target braking torque Nr by means of the slip factor control module 4 in the second embodiment is illustrated as a flow chart in FIG. 8. First, at a step 202, the wheel speed ω of each wheel and the vehicle speed V are loaded from the respectively corresponding sensors. Subsequently, at a step 204, the deviation $\underline{e}$ between the target wheel speed $\omega_r$ and the wheel speed ω (Namely, e=ω–$\omega_r$) is computed for each wheel. Lastly, at a step 206, the target braking torque Nr of each wheel is computed in conformity with Eqs. (26) and (27) or with Eq. (29), and each computed result is delivered to the N-P conversion module 6.

The entire computation (steps 202–206) stated above is repeated every fixed cycle. Herein, the quantities e[k], Nr[k], x[k] etc. must be updated to those of a new time each time the computation is executed. Incidentally, the computations of the modules except the slip factor control module 4 are similar to those in the first embodiment and shall be omitted from description.

According to the second embodiment, the phase lag can be compensated in the frequency domain by the frequency shaping filter.

Now, the third embodiment of the present invention will be described.

As explained before, the P valve is included in the hydraulic circuit of the rear wheel side. Accordingly, the pressure increasing or decreasing gradients of the actual braking hydraulic pressure on the rear wheel side changes before and behind the bend point of the P valve. For this reason, in evaluating the estimative braking hydraulic pressure P by means of the hydraulic pressure control module 8 shown in FIG. 2, the hydraulic pressure P cannot be estimated just as the actual braking hydraulic pressure if the hydraulic-pressure time constants $a_i$ and $a_d$ are uniquely (fixedly) determined. In order to eliminate such a drawback, the third embodiment consists in that the value of each of the hydraulic-pressure time constants $a_i$ and $a_d$ is altered before and behind the bend point of the P valve so as to realize the control as desired.

Figure 9:
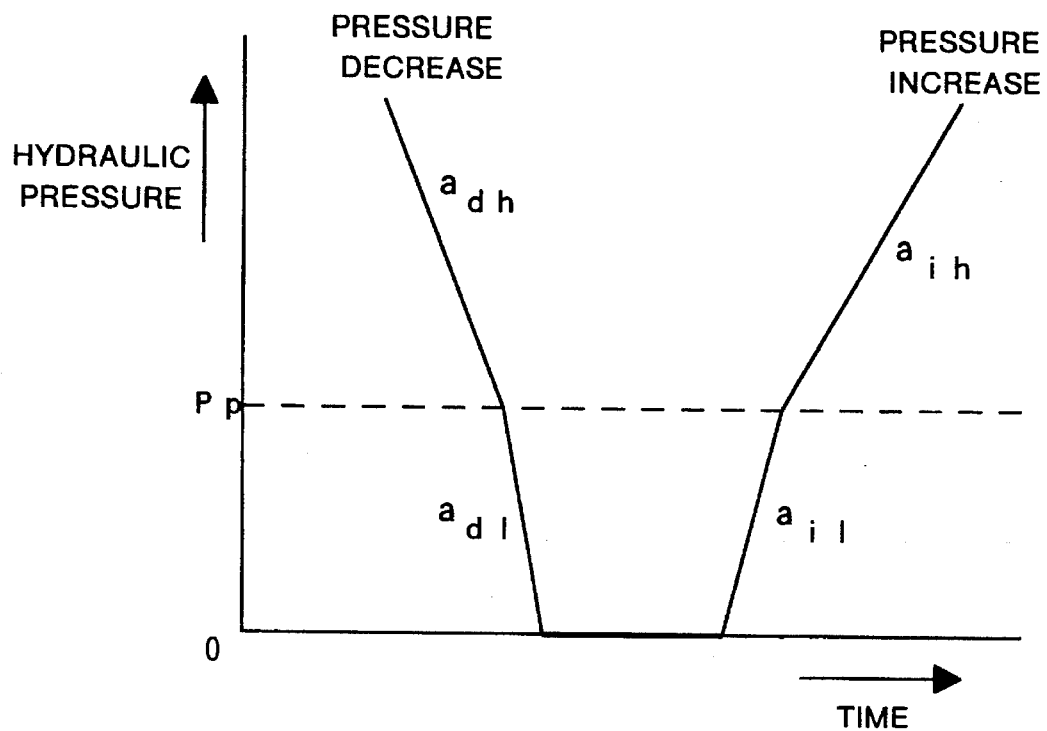
FIG. 9 is a graph showing variations in an estimative braking hydraulic pressure on the rear wheel side of a motor vehicle.

FIG. 9 is a graph showing the changes of the estimative braking hydraulic pressure P on the rear wheel side. Referring to the figure, symbol $P_p$ denotes the hydraulic pressure of the predetermined bend point of the P valve. Symbols $a_{ih}$ and $a_{dh}$ indicate the values of the hydraulic-pressure time constants $a_i$ and $a_d$ on a high pressure side relative to the pressure $P_p$, respectively. Likewise, symbols $a_{il}$ and $a_{dl}$ indicate the values of the hydraulic-pressure time constants $a_i$ and ad on a low pressure side relative to the pressure $P_p$, respectively.

Figure 10:
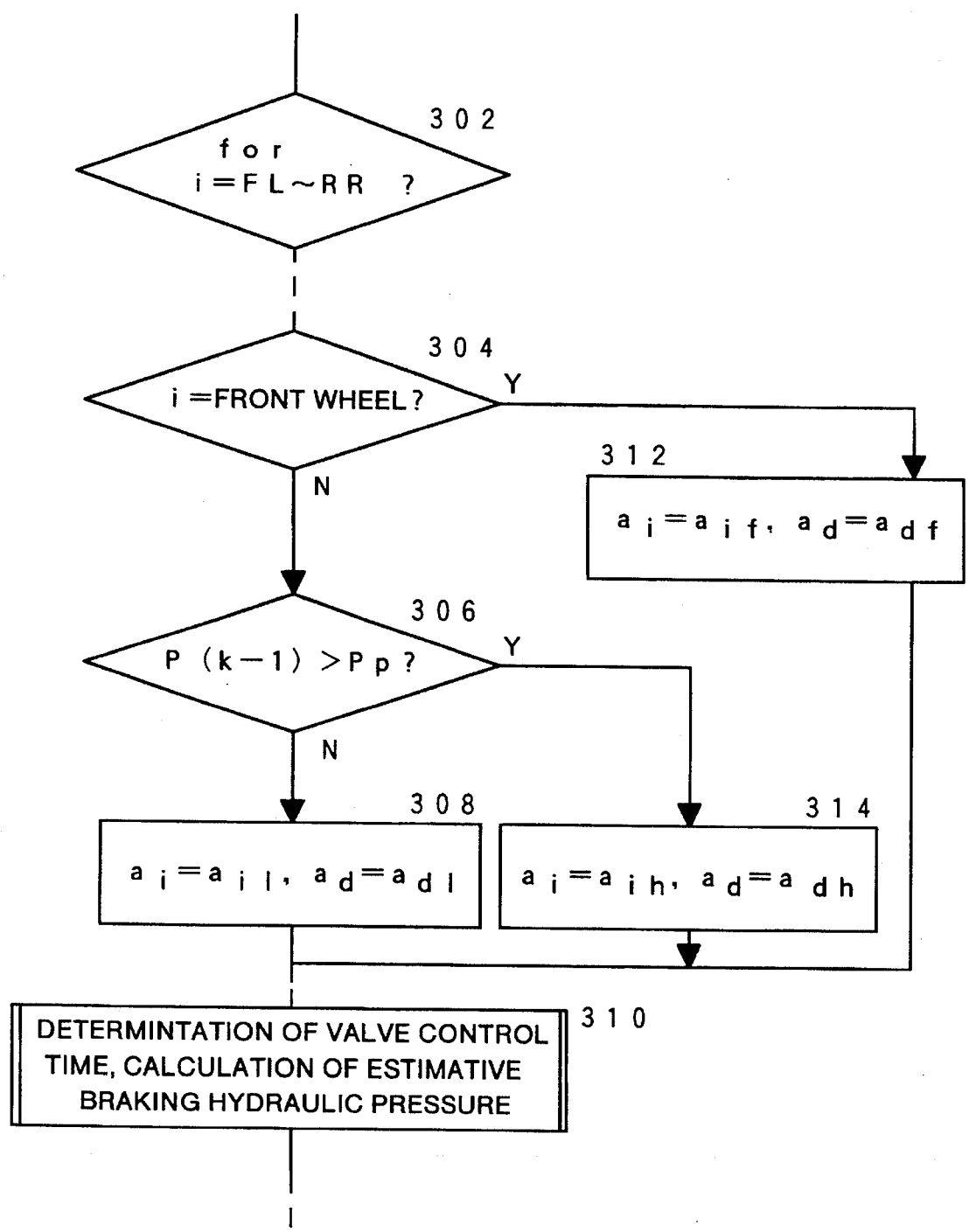
FIG. 10 is a flow chart showing the control of the third embodiment of the present invention.

In addition, FIG. 10 is a flow chart showing the control of the third embodiment.

The practicable control of the third embodiment will be explained with reference to the flow chart of FIG. 10 below.

First, which of the four wheels of the motor vehicle is to be currently processed is judged at a step 302 in FIG. 10. Thus, the loop of a pertinent program is started, and it is iterated for the four wheels. In a case where the wheel to be processed has been judged the front wheel at a step 304, the parameters $a_i$ and $a_d$ need not be altered before and behind the bend point of the P valve. Therefore, the control flow proceeds to a step 312, at which the hydraulic-pressure time constants $a_i$ and $a_d$ of Eqs. (22) and (24) and Eqs. (23) and (25) are respectively set at the hydraulic-pressure time constants $a_{if}$ and $a_{df}$ of the pressure increasing and decreasing operations conformed to the pressure increasing and decreasing gradients of the front wheel side. Then, the step 312 is followed by a step 310.

On the other hand, in case of the judgement at the step 304 that the wheel to be processed is not the front wheel, but that it is the rear wheel, the estimative braking hydraulic pressure P(k–1) already estimated in the last cycle in this control procedure is compared with the pressure $P_p$ of the bend point of the P valve at the next step 306. If the estimative braking hydraulic pressure P(k–1) in the last cycle is higher than the pressure $P_p$, the control flow proceeds to a step 314, at which the hydraulic-pressure time constants $a_i$ and $a_d$ are respectively set at the high-pressure-side time constants $a_{ih}$ and $a_{dh}$, and which is followed by the step 310. Further, if the estimative braking hydraulic pressure P(k–1) in the last cycle is not higher than the pressure $P_p$, the control flow proceeds to a step 308, at which the hydraulic-pressure time constants $a_i$ and $a_d$ are respectively set at the low-pressure-side time constants $a_{il}$ and $a_{dl}$, and which is followed by the step 310.

At the step 310, using Eqs. (24) or (22), and Eqs. (25) or (23), the valve control time $t_i$ or $t_d$ is determined, and the estimative braking hydraulic pressure P(k) is calculated.

According to this embodiment, the hydraulic-pressure time constants $a_i$ and $a_d$ are respectively selected in conformity with the discrepancies of the pressure increasing and decreasing gradients before and behind the bend point of the P valve. Therefore the estimative braking hydraulic pressure P(k) can be estimated more precisely, and the performance of the control to the target braking hydraulic pressure Pr is enhanced more to that extent.

Incidentally, the controls of the modules except the hydraulic pressure control module 8 are similar to those in the first embodiment.

According to the third embodiment, the hydraulic-pressure time constants $a_i$ and $a_d$ are respectively altered on the hydraulic pressure model in accordance with the pressure increasing and decreasing gradients before and behind the bend point of the P valve, so that the error of the estimative hydraulic pressure to be calculated can be prevented from arising.

Now, the fourth embodiment of the present invention will be described.

In a case where a voltage applied to the actuator has changed (lowered), the actuator incurs a response delay and fails to be appropriately controlled. In order to eliminate such a drawback, the fourth embodiment consists in that each of the hydraulic-pressu re time constants $a_i$ and $a_d$ is altered in evaluating the corresponding one of the valve control times $t_i$ and $t_d$ by means of the hydraulic pressure control module 8 shown in FIG. 2.

Figure 11:
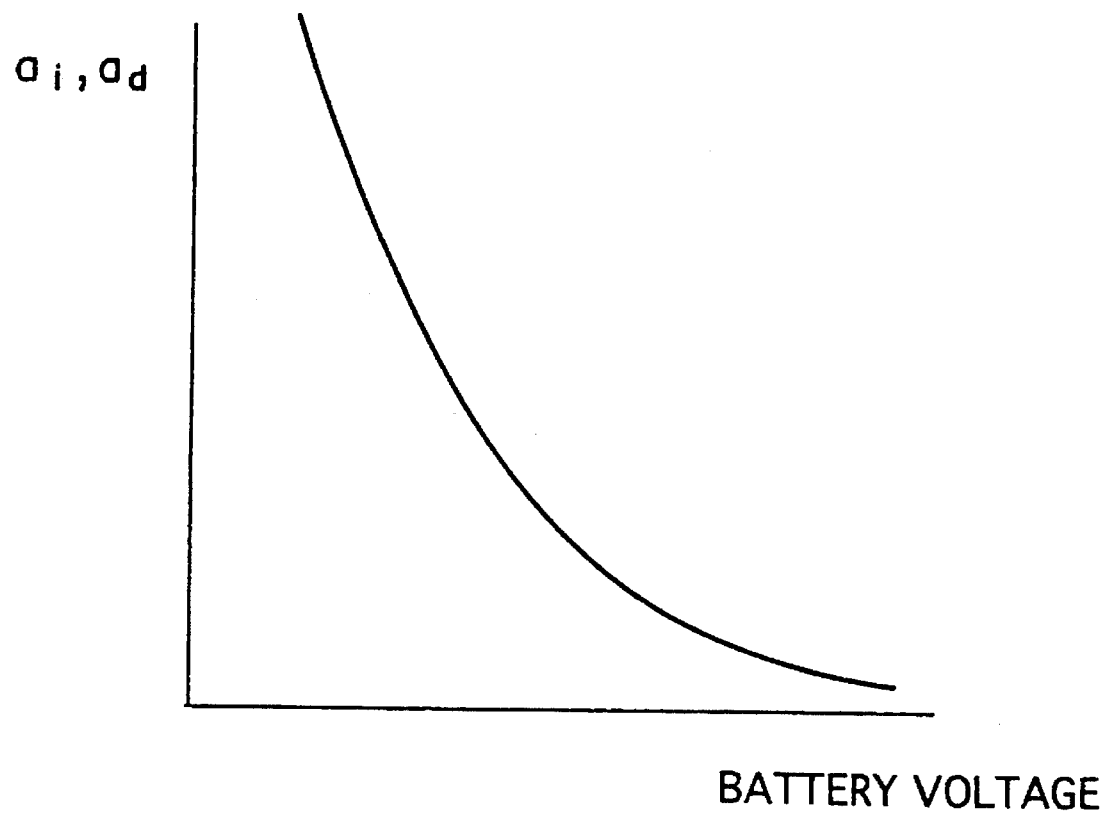
FIG. 11 is a graph showing the relationship between the battery voltage of a power source and each of hydraulic-pressure time constants.

FIG. 11 illustrates the relationship between the voltage of a power source (battery) and each of the hydraulic-pressure time constants $a_i$ and $a_d$. As shown in the figure, in a case where the battery voltage is low by way of example, the actuator cannot be controlled as intended without enlarging the value of the time constant $a_i$ or $a_d$.

Figure 12:
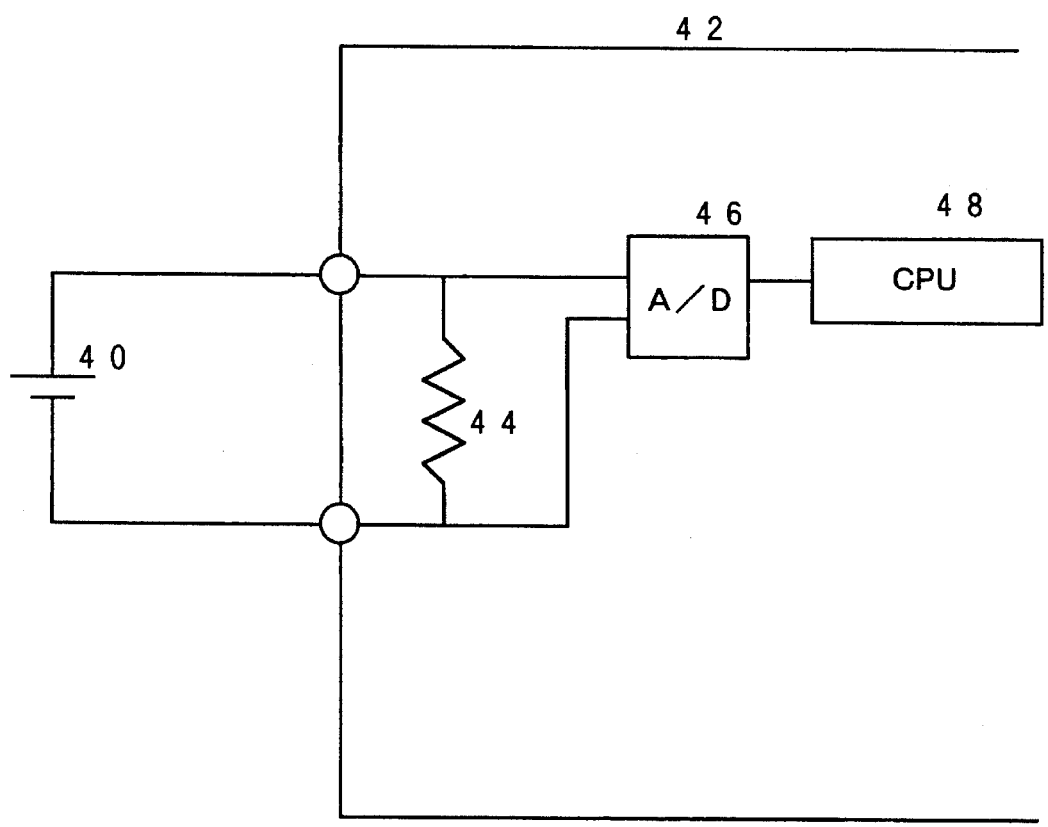
FIG. 12 is a circuit diagram showing a battery voltage monitoring circuit in the fourth embodiment of the present invention.

FIG. 12 illustrates a battery voltage monitoring circuit which is used in the fourth embodiment.

Referring to FIG. 12, the anode and cathode of a battery 40 are led to a controller 42, and a resistor of high impedance 44 is connected across the electrodes. The value of a voltage applied to the resistor 44 is measured as the voltage value Eb of the battery 40 and is input as a digital value to a computer (CPU) 48 by an A/D (analog-to-digital) converter circuit 46.

Figure 13:
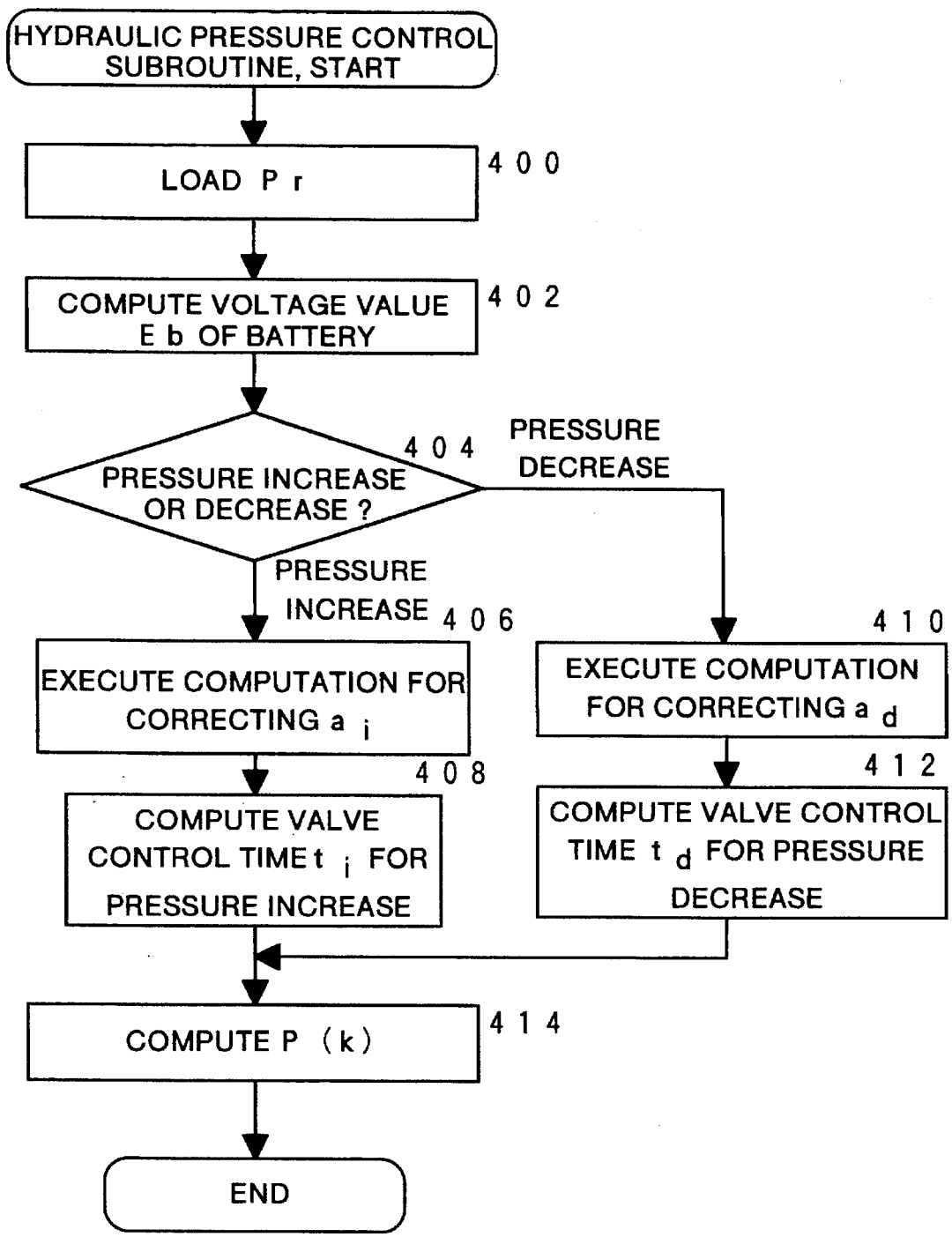
FIG. 13 is a flow chart showing the control of the fourth embodiment of the present invention.

The practicable control of the hydraulic pressure control module 8 in the fourth embodiment is illustrated as a flow chart in FIG. 13, which will now be referred to. Incidentally, the controls of the modules except the hydraulic pressure control module 8 are similar to those in the first embodiment.

First, at a step 400, the target braking hydraulic pressure Pr is loaded from the N-P conversion module 6. Subsequently, at a step 402, the voltage value Eb of the battery 40 is computed by the controller shown in FIG. 12. At the next step 404, the target braking hydraulic pressure Pr is compared with the estimative braking hydraulic pressure P(k−1) in the last cycle so as to judge whether the hydraulic pressure is to be increased or decreased.

In a case where the pressure increase has been judged at the step 404, the control flow proceeds to a step 406. Here, the hydraulic-pressure time constant $a_i$ which determines the valve control time $t_i$ for the pressure increase is computed for correction by the use of the voltage value Eb computed at the step 402. On this occasion, as seen from FIG. 11, when the voltage value Eb indicates a lower voltage, the hydraulic-pressure time constant $a_i$ is made larger in order to prolong the valve control time $t_i$. To the contrary, when the voltage value Eb indicates a higher voltage, the hydraulic-pressure time constant $a_i$ is made smaller.

After the correctional computation of the hydraulic-pressure time constant $a_i$ at the step 406, the control flow proceeds to a step 408, at which the valve control time $t_i$ for the pressure increase is computed in conformity with Eq. (24) and which is followed by a step 414.

On the other hand, in a case where the pressure decrease has been judged at the step 404, the control flow proceeds to a step 410. Here, the hydraulic-pressure time constant $a_d$ which determines the valve control time $t_d$ for the pressure decrease is computed for correction by the use of the voltage value Eb computed at the step 402. The valve control time $t_d$ for the pressure decrease is computed in conformity with Eq. (25) at the next step 412, which is followed by the step 414.

At the step 414, the estimative braking hydraulic pressure P(k) at the current point of time is computed in conformity with Eq. (22) or Eq. (23) by the use of the valve control time $t_i$ or $t_d$ calculated at the corresponding step 408 or 412.

According to this embodiment, the hydraulic-pressure time constants $a_i$ and $a_d$ are altered in accordance with the voltage value Eb, whereby the actuator can be prevented from incurring the response delay which arises due to the fluctuation of the voltage value Eb of the voltage source.

Now, the fifth embodiment of the present invention will be described.

In each of the embodiments thus far described, the corresponding one of the valves 31a~31d and 32a~32d is driven by the valve control time $t_i$ or $t_d$ evaluated in conformity with Eq. (24) or Eq. (25), so as to control the actual braking hydraulic pressure to the target braking hydraulic pressure Pr. In this regard, in a case where the valve control time $t_i$ or $t_d$ as a pressure increase or decrease command is less than a specific control time (for example, 3 [msec]), a problem to be stated below occurs. More specifically, even when the command of the shorter valve control time is output, the actual braking hydraulic pressure is hardly altered due to the characteristics of the actuator. Nevertheless, the estimative braking hydraulic pressure P(k) changes in correspondence with the value of the command. In consequence, the difference between the actual braking hydraulic pressure and the estimative braking hydraulic pressure P(k) enlarges gradually. Herein, in a case where the command of any value smaller than, for example, 3 [msec] is prevented from being output, the above problem of the gradual enlargement of the difference is certainly avoided, but a problem to be stated below takes place.

More specifically, FIG. 14 illustrates the relationship between the target braking hydraulic pressure Pr and the estimative braking hydraulic pressure P(k). In the case where, as shown in FIG. 14, the pressure increase or decrease command is not output by nullifying the command value less than 3 [msec], it is output for the first time when the hydraulic pressure difference between the target braking hydraulic pressure Pr and the estimative braking hydraulic pressure P(k) has become so large as to require a pressure increase or decrease for, at least, 3 [msec] as indicated at letter C in the figure. Near the maximum point D of the curve of the target braking hydraulic pressure Pr in FIG. 14, accordingly, the estimative braking hydraulic pressure P(k) continues to involve errors relative to the target pressure Pr for a long time. This state may cause a vibration of the movements of the wheels by way of example, to lower the control performance of the braking force control system.

The fifth embodiment solves this problem, that is, the timing lag of the pressure increase or decrease command is eliminated in such a way that the command of the value smaller than 3 [msec] is output as the command of the value of 3 [msec], for example, any command from 1 [msec] to 3 [msec] is revalued as the command of 3 [msec].

FIG. 15 is a graph for explaining a hydraulic pressure variation based on the operation of the fifth embodiment.

Regarding the target braking hydraulic pressure Pr and the estimative braking hydraulic pressure P(k) shown in FIG. 15, letter E indicates a pressure decrease timing in any of the first thru fourth embodiments. In the case where the command value which is not smaller than 1 [msec] and is smaller than 3 [msec] is carried to 3 [msec] so as to output the corresponding command, only 1 [msec] of the difference between the target braking hydraulic pressure Pr and the estimative braking hydraulic pressure P(k) is sufficient to issue the pressure decrease command. Accordingly, the pressure decrease timing E is advanced to that extent, namely the pressure decrease command is output at a timing F indicated in FIG. 15.

By the way, it is anticipated herein that the desired braking hydraulic pressure Pr might become oscillatory due to the carry of the command value between 1 [msec] and 3 [msec] to the command value of 3 [msec]. However, since the motor vehicle is more significantly affected by the oscillation of the wheel speed ω and the degradation of the control performance which are attributed to the lag of the timing of the pressure increase or decrease, the control of this embodiment is thought more preferable.

The practicable control of the fifth embodiment will be explained with reference to the flow chart of FIG. 16 below.

Figure 16:
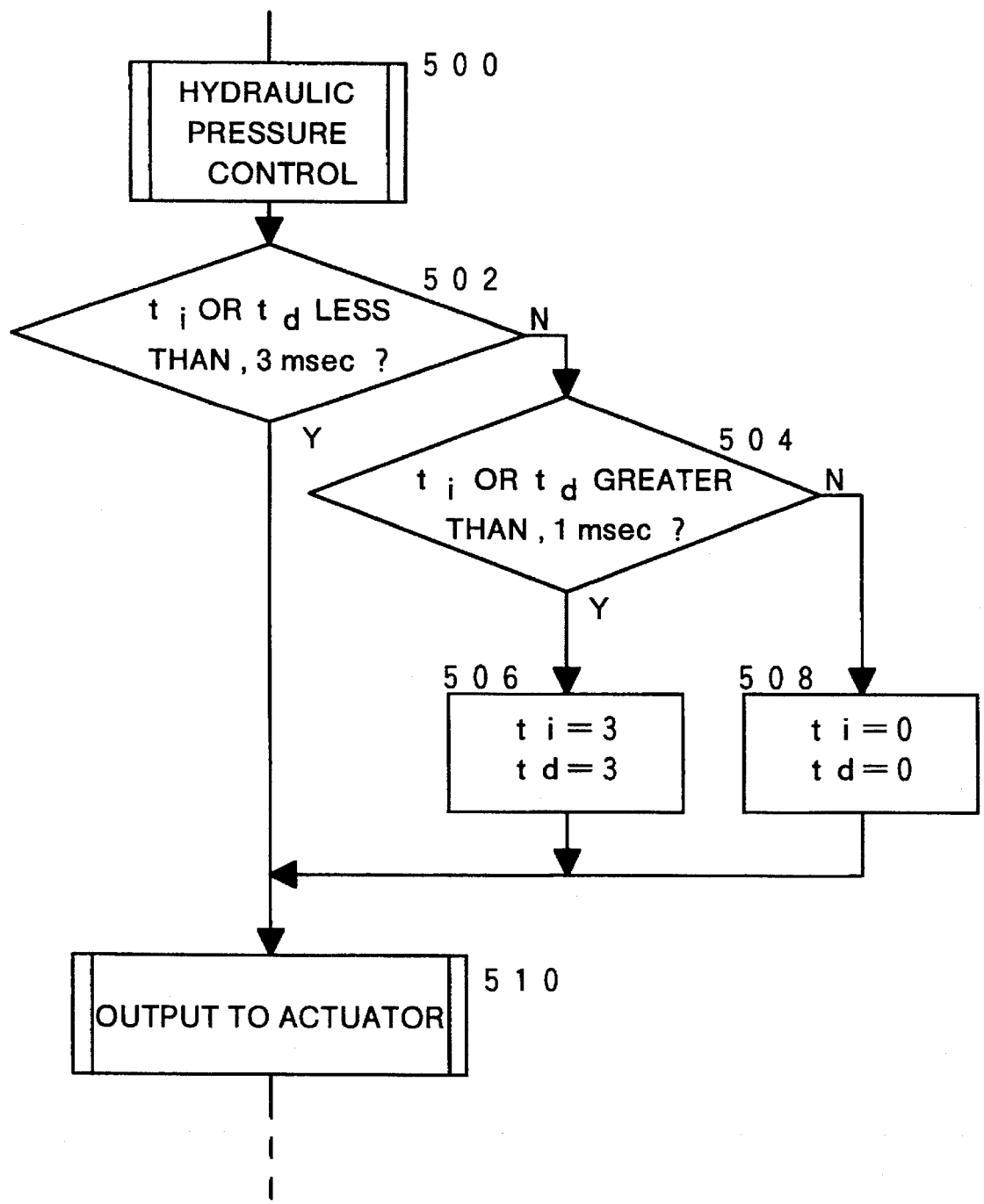
FIG. 16 is a flow chart showing the control of the fifth embodiment.

A step 500 in FIG. 16 is a routine for computing the valve control time $t_i$ or $t_d$ in conformity with the hydraulic pressure model by means of the hydraulic pressure control module 8 shown in FIG. 2. The fifth embodiment adds new logic after the step 500.

At the next step 502, the value of the valve control time $t_i$ or $t_d$ computed at the step 500 is checked. If the computed value is more than or equal to 3 [msec], the control flow proceeds to a step 510, at which the value is output as a command value to the actuator without any alteration.

On the other hand, when the valve control time $t_i$ or $t_d$ has been decided less than 3 [msec] at the step 502, it is compared with 1 [msec] at a step 504. On condition that the valve control time $t_i$ or $t_d$ is more than or equal to 1 [msec], the control flow proceeds to a step 506, at which this valve control time $t_i$ or $t_d$ is altered ( increased ) to 3 [msec ] and which is followed by the step 510. In contrast, on condition that the valve control time $t_i$ or $t_d$ has been decided less than 1 [msec] at the step 504, the control flow proceeds to a step 508, at which this valve control time $t_i$ or $t_d$ is nullified and which is followed by the step 510.

Incidentally, although the value less than 1 [msec] is handled as 0 [msec] in this embodiment, the valve control time $t_i$ or $t_d$ of 0–1 [msec] may well be carried to 3 [msec] so as to output the corresponding command.

According to this embodiment, in the case where that control time shorter than the specific time with which the actuator cannot control the hydraulic pressure has been calculated, it is handled as the shortest control time which permits the control, and hence, the control timing of the actuator can be prevented from lagging.

Now, the sixth embodiment of the present invention will be described.

In the braking control, after the control signal (a pressure increase signal, pressure decrease signal or a holding signal to any of the valves 31a–31d and 32a–32d.) is output, a specific delay time (for example, about 5 [msec]) usually lapses, and thereafter, the hydraulic pressure actually begins to change due to a delay which is inherent to in the hydraulic pressure itself. In order to cancel the delay, the sixth embodiment consists in that the estimative braking hydraulic pressure P(k–1) preceding one calculational cycle is output as (or in place of) the estimative braking hydraulic pressure P(k) at the current point of time.

In the case where the hydraulic pressure is controlled by the use of the hydraulic pressure model without considering the above-mentioned delay, the deviation between the target braking hydraulic pressure Pr and the estimative braking hydraulic pressure P(k) enlarges gradually. This might pose the problem that a necessary braking force control expected of the control system cannot be realized, so the motor vehicle might fail to be controlled to the target slip factor Sr. Therefore, the delay should preferably be canceled.

A method of canceling the delay will be explained with reference to FIG. 17.

Figure 17:
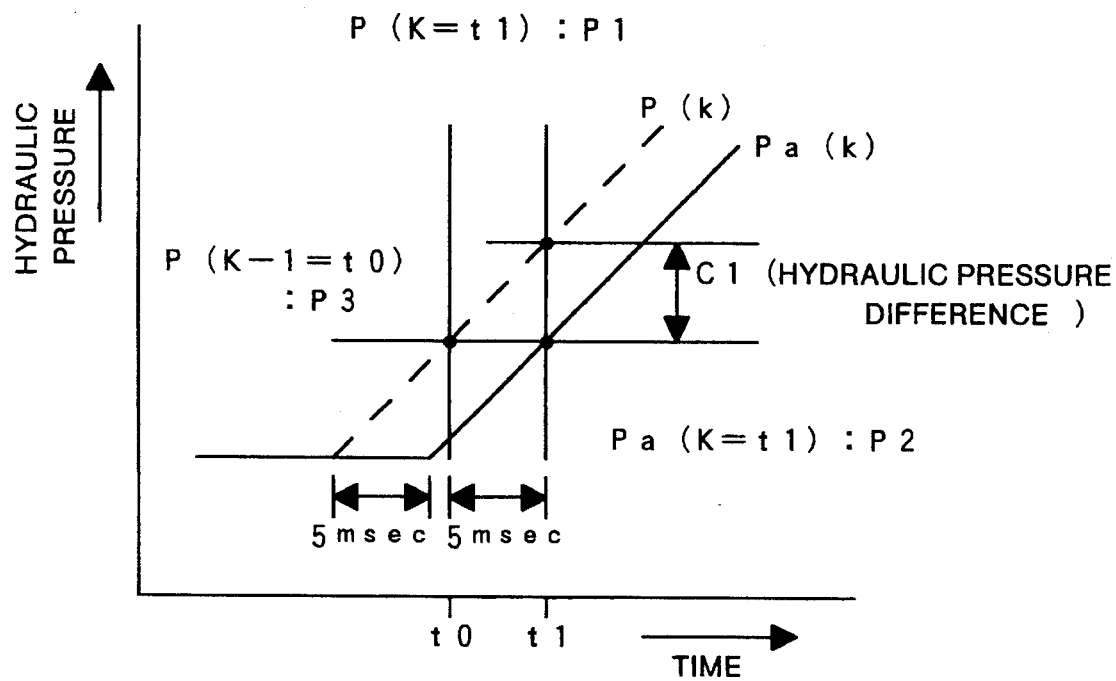
FIG. 17 is a graph for explaining the control of the sixth embodiment of the present invention.

As shown in FIG. 17, the delay or deviation of 5 [msec] exists before the actual braking hydraulic pressure Pa(k) takes the same value as that of the estimative braking hydraulic pressure P(k). Accordingly, letting symbol P1 denote the estimative braking hydraulic pressure $P(k=t_1)$ at a certain point of time $t_1$, this estimative pressure corresponds to the actual braking hydraulic pressure $Pa(k=t_1)$ which is indicated by symbol P2 in the figure. Therefore, a hydraulic pressure difference C1 (=P1–P2) exists between the pressures P1 and P2.

In order to cancel the hydraulic pressure difference C1, this embodiment replaces the value P1 of the estimative braking hydraulic pressure $P(k=t_1)$ at the point of time $t_1$, with the value P3 of the estimative braking hydraulic pressure $P(k–1=t_0)$ calculated at a point of time $t_o$ which is 5 [msec] before the point of time $t_1$. Thus, the hydraulic pressure difference C1 is canceled.

The practicable control of the sixth embodiment will be explained with reference to the flow chart of FIG. 18 below.

The sixth embodiment pertains to the calculation of the estimative braking hydraulic pressure P(k) in the hydraulic pressure control module 8 shown in FIG. 2, and the other controls thereof are similar to those of the first embodiment.

Figure 18:
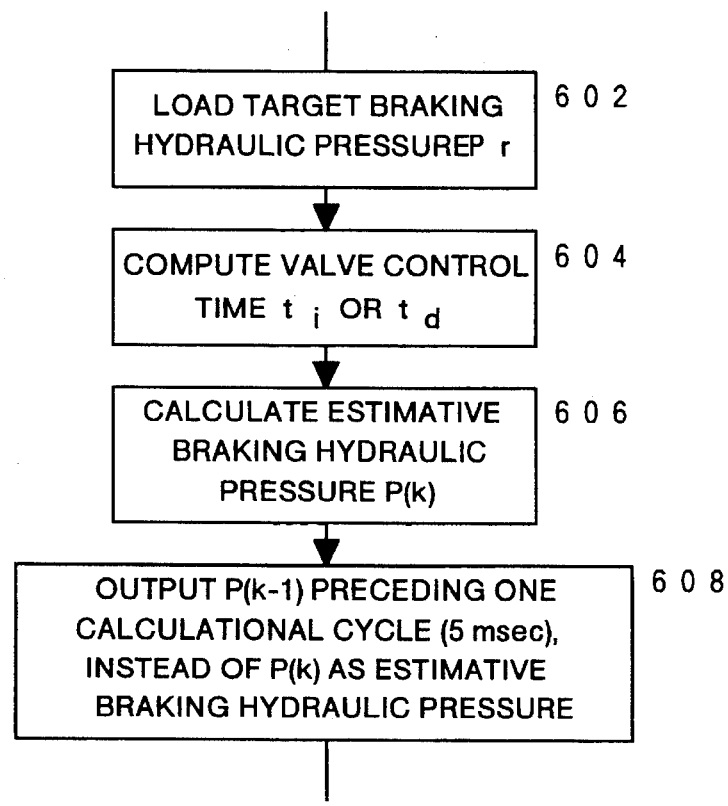
FIG. 18 is a flow chart showing the control of the sixth embodiment.

At a step 602 in FIG. 18, the hydraulic pressure control module 8 accepts the target braking hydraulic pressure Pr from the N-P conversion module 6. At a step 604, the valve control time $t_i$ or $t_d$ is computed in conformity with the corresponding equation (24) or (25). At the next step 606, the estimative braking hydraulic pressure P(k) is calculated in conformity with the corresponding equation (22) or (23).

Herein, the calculational cycle is 5 [msec ] in agreement with the delay of the hydraulic pressure. At the next step 608, therefore, the estimative braking hydraulic pressure P(k–1) preceding one calculational cycle of 5 [msec] is output instead of the estimative braking hydraulic pressure P(k) which is output in any of the first thru fifth embodiments. Thus, the estimative braking hydraulic pressure is output with the delay of 5 [msec] and comes to agree in value with the actual braking hydraulic pressure Pa(k).

As understood from the above explanation, in a case where the delay in the hydraulic pressure circuit is 6 [msec] by way of example, the estimative braking hydraulic pressure to be output may be evaluated by interpolation from the estimative braking hydraulic pressure P(k–1) preceding 5 [msec] and the estimative braking hydraulic pressure P(k–2) further preceding 5 [msec].

According to this embodiment, the hydraulic pressure delay of the actuator relative to the control signal (estimative braking hydraulic pressure P(k)) can be compensated on the hydraulic pressure model which is used in the hydraulic pressure control module 8.

Now, the seventh embodiment of the present invention will be described.

In the hydraulic pressure control, when an estimative braking hydraulic pressure P(Calculated) in calculation has lowered to the atmospheric pressure, the hydraulic pressure delays for a specific time (for example, 50 [msec]) at the next rise thereof due to the influences of the clearance between a brake disc and a pad, the rigidity characteristics of the hydraulic pressure itself, etc. When the delay is not considered, an error arises between the target braking hydraulic pressure Pr and the estimative braking hydraulic pressure P(k). The seventh embodiment therefore consists in that, when the calculational estimative braking hydraulic pressure P(Calculated) has become a predetermined hydraulic pressure Pth equivalent to the atmospheric pressure or below, an estimative braking hydraulic pressure P(Output) as an output is maintained at the predetermined hydraulic pressure Pth until the calculational estimative braking hydraulic pressure P(Calculated) resumes a state greater than the predetermined hydraulic pressure Pth, and further, the predetermined time (50 [msec]) lapses since the resumption.

Here, the "state in which the hydraulic pressure has lowered to become equivalent to the atmospheric pressure during the antiskid control" signifies, for example, a state in which the motor vehicle has advanced from a high-μ(friction factor) road to a low-μ road, so the hydraulic pressure has been abruptly decreased to become equivalent to the atmospheric pressure.

The processing which is executed after the calculational estimative braking hydraulic pressure P(Calculated) has lowered to become equivalent to the atmospheric pressure or less, will be concretely explained with reference to FIG. 19.

It is now assumed in FIG. 19 that the estimative braking hydraulic pressure P(Calculated) has been obtained by computation as indicated by a dot-and-dash line. In this case, even when the value of the hydraulic pressure P(Calculated) has become lower than the predetermined value Pth equivalent to the atmospheric pressure, the actual braking hydraulic pressure Pa currently exerted on the wheel Wh does not become below the atmospheric pressure (=Pth). Therefore, unless the estimative braking hydraulic pressure P(Output) as the output is maintained at the predetermined value Pth, it comes to differ from the actual braking hydraulic pressure Pa, to lower the performance of the hydraulic pressure control. Accordingly, even when the calculational value P (Calculated) of the estimative braking hydraulic pressure P has become lower than the predetermined value Pth, the estimative braking hydraulic pressure P(Output) as the output which is actually used for the control is to be maintained at the predetermined value Pth (refer to a broken line).

Meanwhile, even when the calculated estimative braking hydraulic pressure P(Calculated) has resumed the state greater than the predetermined value Pth, from the state equal to or smaller than the same, at a point of time $t_5$, the time period of about 50 [msec] is required for the actual braking hydraulic pressure Pa to rise above the predetermined value Pth, as explained before. Therefore, unless the estimative braking hydraulic pressure P is output at a point of time $t_6$ which is delayed 50 [msec] from the timing $t_5$ of the computational resumption, the estimative braking hydraulic pressure P(Output) and the actual braking hydraulic pressure Pa fail to agree. For this reason, the estimative braking hydraulic pressure P(Output) as the output is caused to rise at the point of time $t_6$ which is 50 [msec] later than the point of time $t_5$ in FIG. 19. As a result, the difference between the actual braking hydraulic pressure Pa and the estimative braking hydraulic pressure P(Output) can be suppressed to a small value.

The practicable control of the seventh embodiment will be explained with reference to the flow chart of FIG. 20 below.

The control of this embodiment is performed subsequently to the computation of the valve control time $t_i$ or $t_d$ and that of the estimative braking hydraulic pressure P by the hydraulic pressure control module 8 shown in FIG. 2.

First, at a step 702, the estimative braking hydraulic pressure P(Calculated) is compared with the predetermined value Pth equivalent to the atmospheric pressure. When the estimative braking hydraulic pressure P(Calculated) is equal to or smaller than the predetermined value Pth, the control flow proceeds to a step 704, at which whether or not a flag $P_{FLAG}$ for indicating the execution of the delay compensation control is ON is judged.

If the flag $P_{FLAG}$ is not ON, the estimative braking hydraulic pressure P(Calculated) has first lowered from the value greater than the atmospheric pressure, to the value equal to or smaller than the same, in this cycle. At a step 706, therefore, the flag $P_{FLAG}$ is turned ON so as to set the estimative braking hydraulic pressure P(Output) at one atmosphere (or the predetermined value Pth: the same holds true hereinbelow). Besides, if the flag$_{FLAG}$ is ON, the delay compensation control is under execution, and the estimative braking hydraulic pressure P(Output) is maintained at one atmosphere at a step 707.

On the other hand, when the estimative braking hydraulic pressure P(Calculated) is greater than the predetermined value Pth as the judgement of the step 702, the control flow proceeds to a step 708, at which whether or not the flag$_{FLAG}$ is ON is judged. If the flag$_{FLAG}$ is ON, the state is meant in which the estimative braking hydraulic pressure P(Calculated) has resumed the value greater than the atmospheric pressure, from the value equal to or smaller than the same. At the next step 710, therefore, whether or not the compensation control within 50 [msec] after the resumption is under execution is judged.

Concretely, since one calculational cycle is 5 [msec] in this embodiment, when the counted number $i$ of calculational cycles is 9 or less, then the compensation control within 50 [msec] is judged as being under execution. In this case, at a step 712, the estimative braking hydraulic pressure P(Output) is maintained at one atmosphere, and the counted number $i$ of calculational cycles is incremented one.

On the other hand, when the number $i$ has become greater than 9 as the judgement of the step 710, it is meant that the time period of 50 [msec] has lapsed after the resumption of the estimative braking hydraulic pressure P(Calculated) to the value greater than the predetermined value Pth. At a step 714, therefore, the number $i$ is set at zero, the flag$_{FLAG}$ is turned OFF, and an estimative braking hydraulic pressure P(k−10, Calculated) calculated 10 cycles before is used as the estimative braking hydraulic pressure P(Output).

Besides, when the flag $P_{FLAG}$ is not ON as the judgement of the step 708, it is meant that originally the delay compensation control is not under execution, and the estimative braking hydraulic pressure P (Calculated) has not lowered to the atmospheric pressure or less. Therefore, the processing is directly ended.

Incidentally, the delay usually disappears with the lapse of time. By way of example, therefore, an estimative braking hydraulic pressure P(k: Output) is gradually altered as the estimative braking hydraulic pressure P(k−10, Calculated) preceding 10 cycles→an estimative braking hydraulic pressure P(k−9, Calculated) preceding 9 cycles→an estimative braking hydraulic pressure P(k−8, Calculated) preceding 8 cycles, . . . every predetermined cycle. In this way, the estimative braking hydraulic pressure P(k: Output) is finally converged to the estimative braking hydraulic pressure P(k−1, Calculated) which precedes one cycle and which corresponds to the steady delay, as in the sixth embodiment shown in FIG. 18.

According to the seventh embodiment, in the case where the hydraulic pressure has been decreased to the specific pressure equivalent to the atmospheric pressure during the antiskid control, the value of the estimative braking hydraulic pressure P(k) is maintained at the predetermined value Pth for the predetermined time period. It is therefore possible to prevent the hydraulic pressure delay peculiar to the actuator which arises when the pressure decrease corresponding to the atmospheric pressure is to return to the pressure increase again.

Although the antiskid control has been described as the controlled object in the foregoing embodiments, the present invention is not restricted thereto. Obviously, the present invention is similarly applicable to any control system in which a braking force is controlled on the basis of a target slip factor and an actual slip factor so that a wheel speed may afford the target slip factor, thereby to enhance the stability and steerability of a motor vehicle during the drive thereof.

As described above, according to the present invention, a target braking hydraulic pressure is not directly computed, but a target braking torque is evaluated and is converted into the target braking hydraulic pressure so as to correspond to the motion of a motor vehicle. It is therefore possible to calculate a controlled variable which conforms to the actual motion of the motor vehicle, and to perform a hydraulic pressure control in which the distribution of braking forces in the whole motor vehicle is considered. Accordingly, not only an antiskid control and an acceleration slip control, but also extensive overall vehicle behavior controls for enhancing the stability and steerability of the motor vehicle, etc. can be favorably performed.

What is claimed is:

1. A braking force control system for a motor vehicle, having a hydraulic pressure control device which controls a hydraulic pressure generated by a master cylinder or a pump in a braking system, so as to increase or decrease in accordance with a drive state of the motor vehicle, comprising:

actual-slip-factor calculation means for calculating an actual slip factor of a wheel;

target-braking-torque calculation means for calculating a target braking torque from a preset target slip factor and said calculated actual slip factor so that a wheel speed may come to afford the target slip factor;

target-braking-hydraulic-pressure conversion means for converting said target braking torque into a target braking hydraulic pressure;

detection means for detecting said hydraulic pressure generated by the master cylinder or the pump;

estimative-braking-hydraulic-pressure calculation means for calculating an estimative braking hydraulic pressure which is estimated to be currently acting in the braking system, from said detected hydraulic pressure and a past value of said estimative braking hydraulic pressure by the use of a hydraulic pressure model; and controlled-variable calculation means for calculating a controlled variable of the hydraulic pressure control device from said calculated estimative braking hydraulic pressure and the target braking hydraulic pressure by the use of a reverse hydraulic pressure model.

2. A braking force control system for a motor vehicle as defined in claim 1, wherein said target-braking-torque calculation means comprises error compensation means for compensating for any error which is ascribable to said hydraulic pressure control device.

3. A braking force control system for a motor vehicle as defined in claim 2, wherein said error compensation means performs frequency shaping which is based on an "H ∞ control".

4. A braking force control system for a motor vehicle as defined in claim 2, wherein said error compensation means alters a control gain in accordance with a vehicle speed of said motor vehicle.

5. A braking force control system for a motor vehicle as defined in claim 1, wherein said hydraulic pressure control device comprises a proportioning valve in a hydraulic pressure pipe laid on a rear wheel side of said motor vehicle, and said target-braking-hydraulic-pressure conversion means comprises rear-wheel-side hydraulic pressure conversion means for converting said target braking torque so that rise in the target braking hydraulic pressure of the rear wheel side may become great relative to rise in the target braking hydraulic pressure of a front wheel side of said motor vehicle.

6. A braking force control system for a motor vehicle as defined in claim 1, wherein said hydraulic pressure control device comprises a proportioning valve in a hydraulic pressure pipe laid on a rear wheel side of said motor vehicle, and said estimative-braking-hydraulic-pressure calculation means comprises rear-wheel-side hydraulic-pressure time constant alteration means for altering a hydraulic-pressure time constant of the hydraulic pressure model determined by characteristics of the hydraulic pressure pipe, before and behind a hydraulic-pressure bend point of the proportioning valve, when said estimative-braking-hydraulic pressure calculation means calculates the estimative braking hydraulic pressure of the rear wheel side.

7. A braking force control system for a motor vehicle as defined in claim 1, further comprising voltage detection means for detecting a voltage of a voltage source for said hydraulic pressure control device, and wherein, hydraulic-pressure time constant for use in said hydraulic pressure model is altered, in accordance with said detected voltage.

8. A braking force control system for a motor vehicle as defined in claim 1, wherein said controlled-variable calculation means comprises controlled-variable correction means for correcting said calculated controlled variable up to a controllable value, when the calculated controlled variable has a value which is too small to be controlled by said hydraulic pressure control device.

9. A braking force control system for a motor vehicle as defined in claim 1, wherein said estimative-braking-hydraulic-pressure calculation means comprises delay compensation means for compensating for a delay of an actual braking hydraulic pressure with respect to said calculated estimative braking hydraulic pressure.

10. A braking force control system for a motor vehicle as defined in claim 9, wherein said delay compensation means comprises estimative-braking-hydraulic-pressure maintenance means for maintaining said estimative braking hydraulic pressure at the predetermined value until said calculated estimative braking hydraulic pressure has resumed to a value greater than a predetermined value equivalent to atmospheric pressure, and thereafter a predetermined time period lapses, when said estimative braking hydraulic pressure calculated in the braking force control has lowered to or less than a predetermined value equivalent to atmospheric pressure.

* * * * *

UNITED STATES PATENT AND TRADEMARK OFFICE
CERTIFICATE OF CORRECTION

PATENT NO. : 5,577,812
DATED : November 26, 1996
INVENTOR(S) : Yutaka Hirano, Akira Eiraku, Shinichi Soejima
Yoshinori Kadowaki It is certified that error appears in the above-indentified patent and that said Letters Patent is hereby corrected as shown below:

ON THE TITLE PAGE:

Item [75] Inventors: Please change "Shin'ichi" to --Shinichi--.

Signed and Sealed this

Second Day of September, 1997

Attest:

BRUCE LEHMAN

Attesting Officer    Commissioner of Patents and Trademarks